United States Patent [19]

De Subijana et al.

[11] Patent Number: 5,555,391
[45] Date of Patent: Sep. 10, 1996

[54] SYSTEM AND METHOD FOR STORING PARTIAL BLOCKS OF FILE DATA IN A FILE CACHE SYSTEM BY MERGING PARTIAL UPDATED BLOCKS WITH FILE BLOCK TO BE WRITTEN

[75] Inventors: Joseba M. De Subijana, Minneapolis; Gary R. Robeck, Albertville; Wayne A. Michaelson, Circle Pines; Steven M. Wierdsma, Andover, all of Minn.

[73] Assignee: Unisys Corporation, Blue Bell, Pa.

[21] Appl. No.: 172,663

[22] Filed: Dec. 23, 1993

[51] Int. Cl.$^6$ .................................................. G06F 12/06
[52] U.S. Cl. .......................... 395/440; 395/445; 395/850; 395/411; 364/252.6
[58] Field of Search .................................. 395/427, 411, 395/440, 850, 445, 470, 471; 364/252.6

[56] References Cited

U.S. PATENT DOCUMENTS

| | | | |
|---|---|---|---|
| 4,298,929 | 11/1981 | Capozzi | 395/411 |
| 4,520,439 | 5/1985 | Liepa | 395/411 |
| 5,146,573 | 9/1992 | Sato et al. | 395/416 |
| 5,202,969 | 4/1993 | Sato et al. | 395/470 |
| 5,222,224 | 6/1993 | Flynn et al. | 395/471 |
| 5,235,693 | 8/1993 | Chinnaswamy et al. | 395/486 |
| 5,386,531 | 1/1995 | Blaner et al. | 395/375 |
| 5,420,983 | 5/1995 | Noya et al. | 395/850 |

*Primary Examiner*—Tod R. Swann
*Assistant Examiner*—David J. O'Neill
*Attorney, Agent, or Firm*—Charles A. Johnson; Mark T. Starr

[57] ABSTRACT

A system and method for updating partial blocks of file data stored in a non-volatile storage within a file cache system connected to a host computer system. A first buffer and a last buffer receive from the non-volatile storage the existing portions of the blocks that are to be retained. A write buffer receives new data of a size not equal to an integral multiple of a block from a host computer system. The new data is merged under hardware control with the existing portions contained in the first buffer and the last buffer, thereby updating the cached file.

13 Claims, 16 Drawing Sheets

SYSTEM AND METHOD FOR STORING PARTIAL BLOCKS OF FILE DATA IN A FILE CACHE SYSTEM BY MERGING PARTIAL UPDATED BLOCKS WITH FILE BLOCK TO BE WRITTEN

CROSS REFERENCES TO RELATED APPLICATIONS

This application is related to the concurrently filed application listed below, the disclosure of which is incorporated herein by reference. The listed application is assigned to the same assignee as the present invention.

Outboard File Cache System, Ser. No. 08/174,750, invented by Thomas Cooper and Robert E. Swenson.

BACKGROUND OF THE INVENTION

1. Field of the Invention

This invention relates generally to storage access and control in multi-processor computer systems. More specifically, it relates to the updating of data in a file cache in amounts smaller than one block.

2. Background Information

Co-pending application Ser. No. 08/174,750, discloses a file cache system connected to a host computer system for improving system throughput by minimizing the Input/Output (I/O) bottleneck associated with accessing mass storage sub-systems. It achieves this goal by implementing a caching scheme on files, wherein the cached portions of files are stored in a high-speed, non-volatile storage (NVS) connected to the host system by a fiber optic interface. The unit of cached file data transferred across this interface is one block. A block consists of 28 36-bit words. However, there are occasions when the host computer system needs to update only a fraction of a block of file data in the NVS. One way of performing this operation would be to read the block containing the desired portion from the NVS back to the host system, update portions of the block with new data under software control without disturbing existing, non-referenced data, and write the updated block back to the NVS. This method is relatively slow because of the multiple dam transfers involved and the control of the update by software executing on the host system. Ideally, this merging of new data with existing data in a block should be performed by the file cache system hardware, not by software executing on the host system. This merging function could be done by novel circuitry so as to improve the throughput of the file cache system.

SUMMARY OF THE INVENTION

An object of this invention is to improve the throughput and system performance of a file cache system when updating partial blocks of data which are part of a file currently being cached.

Another object of this invention is to update an amount of data in a file cache system as small as one word without having to perform an update of an entire block of data by a host system.

Still another object of this invention is to efficiently update the data of a file stored in a file cache system when the size of the dam to be updated is more than one block but is not an integral multiple of a block.

Additional objects, advantages and novel features of the invention will be set forth in part in the description which follows, and in part will become apparent to those skilled in the an upon examination of the following or may be learned by practice of the invention. The objects and advantages of the invention may be realized and attained by means of the instrumentalities and combinations particularly pointed out in the appended claims.

According to the present invention, the foregoing and other objects and advantages are attained by a system for updating a selected portion of a file originating on a host computer system, the file being stored in a non-volatile storage within a file cache system. The file is composed of a plurality of segments. Each segment contains a plurality of blocks. Each block contains a plurality of words. The size of the selected portion of a file to be updated is not equal to an integral multiple of the size of a block. The selected file portion is delineated by a first word index within the first block of the file portion and by a last word index within the last block of the file portion. The first block is the same as the last block for file updates of only one block. The unit of data transfer between the host computer system and the file cache system is one or more blocks, which are specified by a number of blocks count. The system comprises a first buffer for storing a first selected file portion received from the non-volatile storage, a last buffer for storing a second selected file portion received from the non-volatile storage, and a write buffer for storing a third selected file portion, this portion being received from the host computer system. A write control mechanism is provided to control the transfer of the file portions to the non-volatile storage by outputting a plurality of selection control signals according to the first word index, the last word index, and the number of blocks count. A selection mechanism is also provided to select either the first, second, or third file portion for transfer to the non-volatile storage according to the selection control signals.

In accordance with another aspect of the invention, a method for updating a selected portion of a cached file comprises the steps of discarding the data contained in the first block of data received from the host computer system from the first word in the first block up to but not including the word selected by the first word index. The data contained in the first block of data and any subsequent blocks received from the host computer system from the word selected by the first word index in the first block up to and including the word selected by the last word index in the last block is stored in the non-volatile storage. Finally, the data contained in the last block of data received from the host computer system from the word within the last block immediately succeeding the word selected by the last word index to the last block is discarded.

A system and method for updating partial blocks of data in a file stored in a file cache system is disclosed. This invention improves system throughput by performing the merging of new file data and old file data in an efficient manner.

Still other objects and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

3

Figure 2:
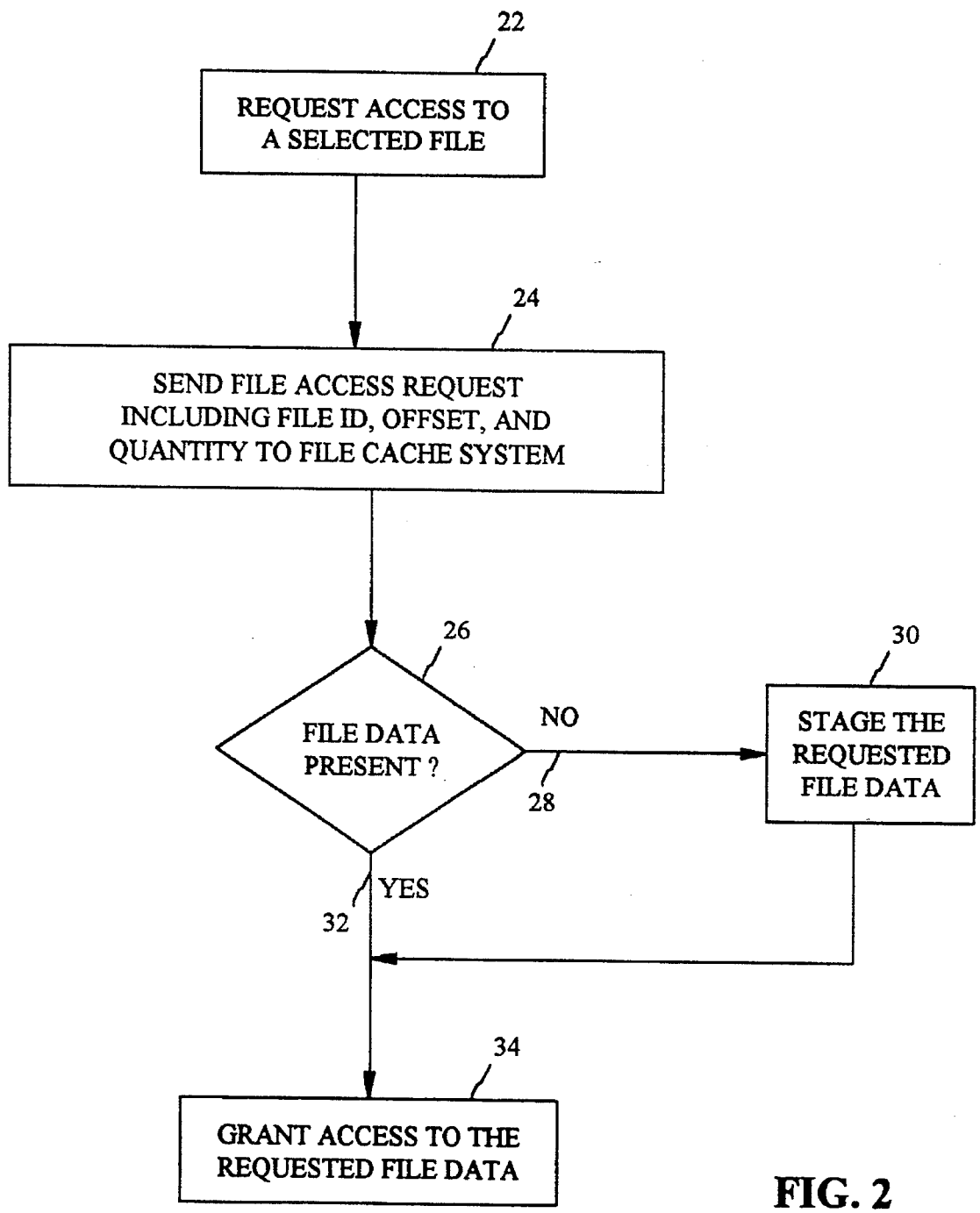

FIG. 2 is a flow chart showing how file accesses are accomplished within the File Cache System.

Figure 3:
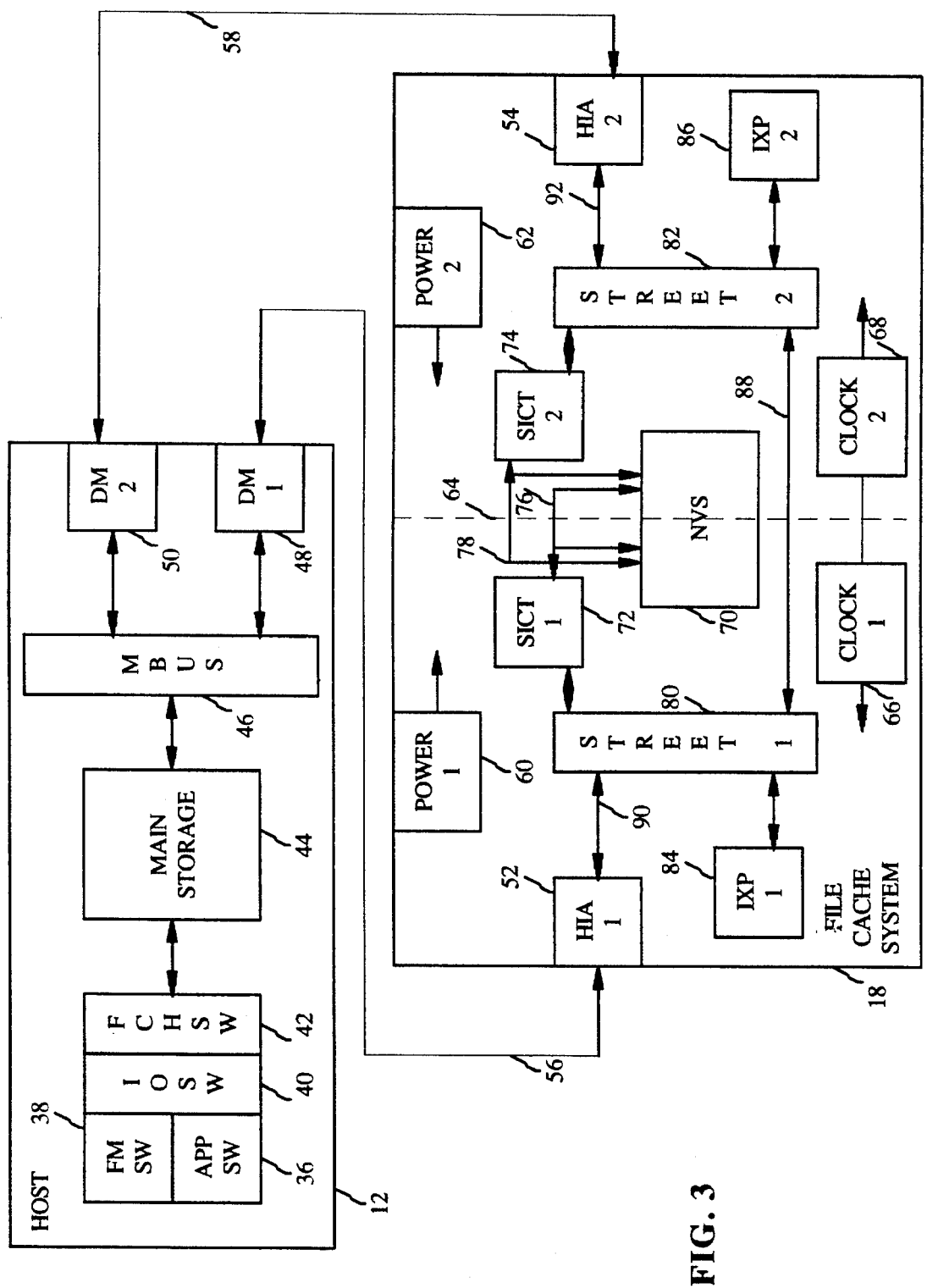

FIG. 3 is a functional block diagram of the hardware and software components of the File Cache System.

Figure 4:
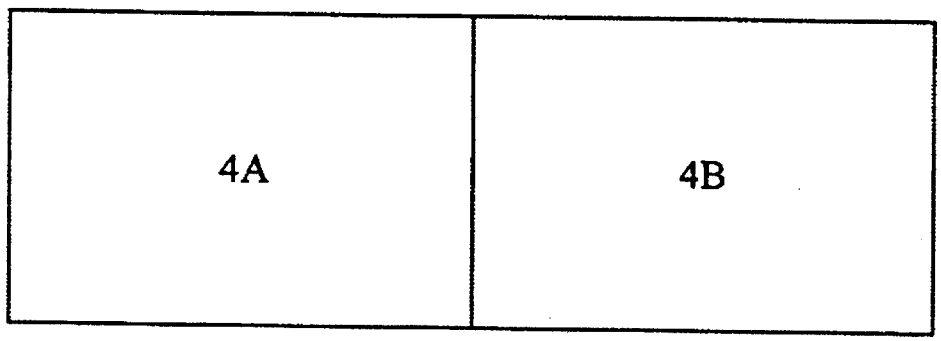
Figure 4A:
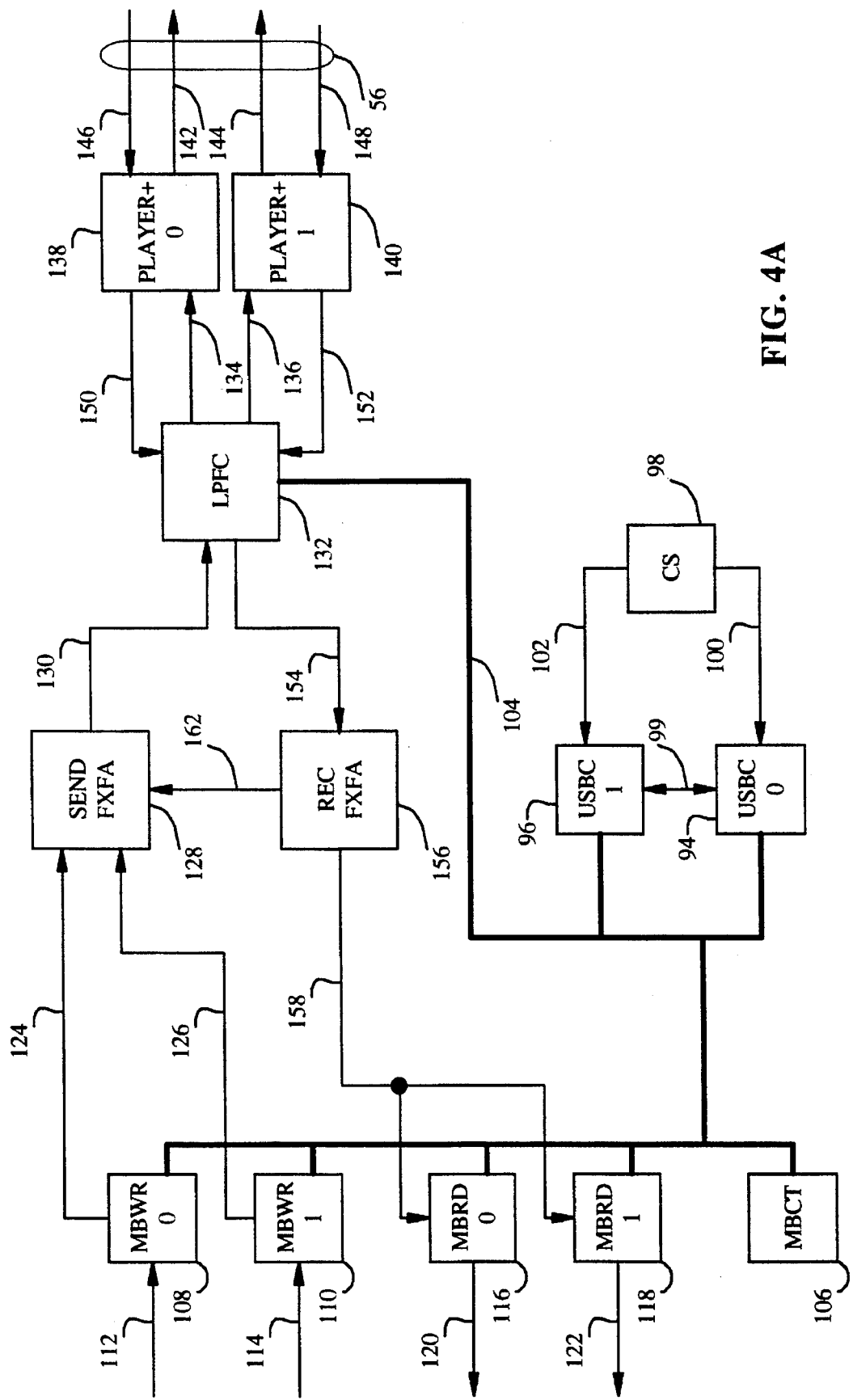
Figure 4B:
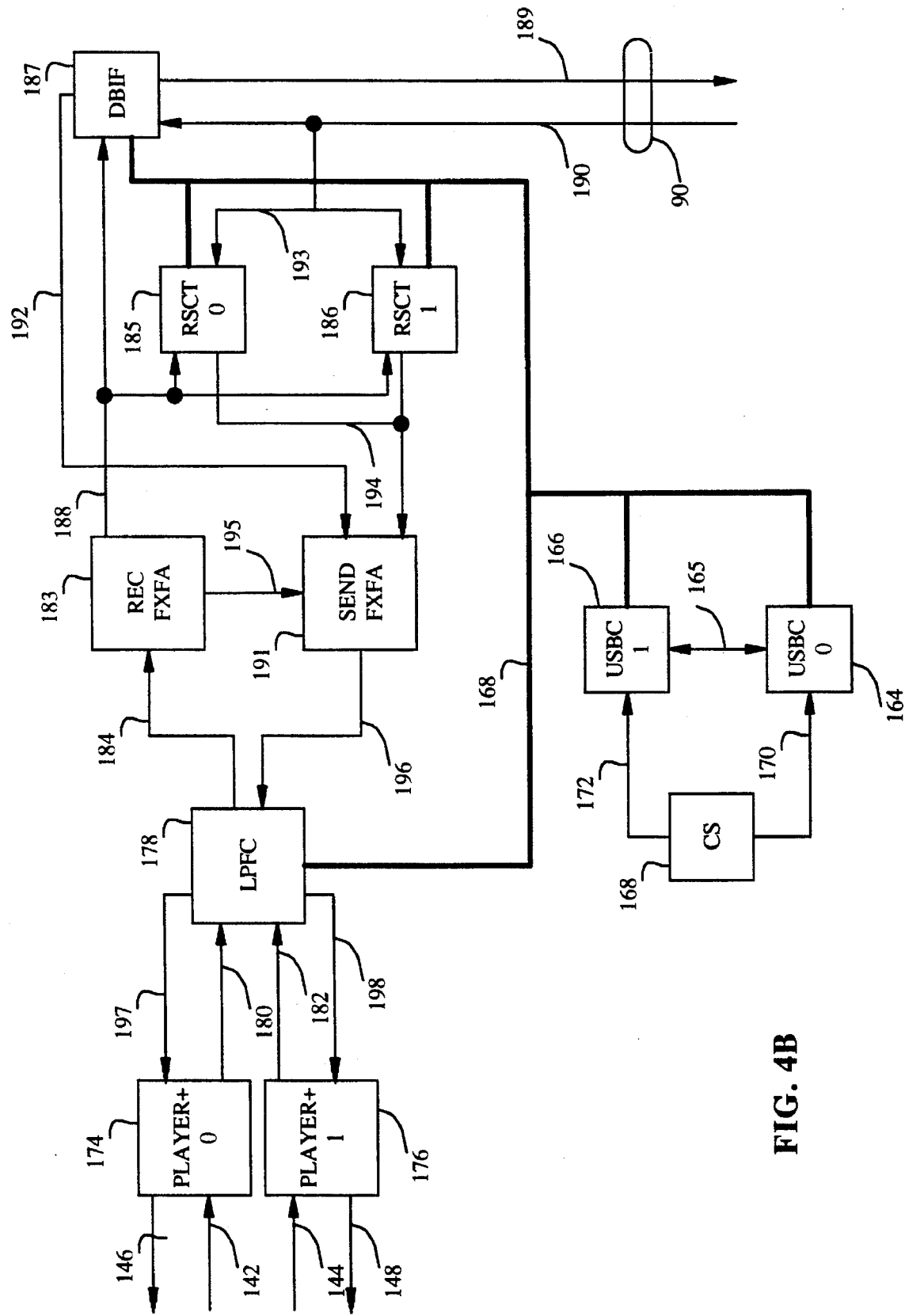

FIG. 4, comprising FIG. 4(A) and FIG. 4(B), is a detailed block diagram showing the components of a Data Mover and a Host Interface Adaptor.

Figure 5:
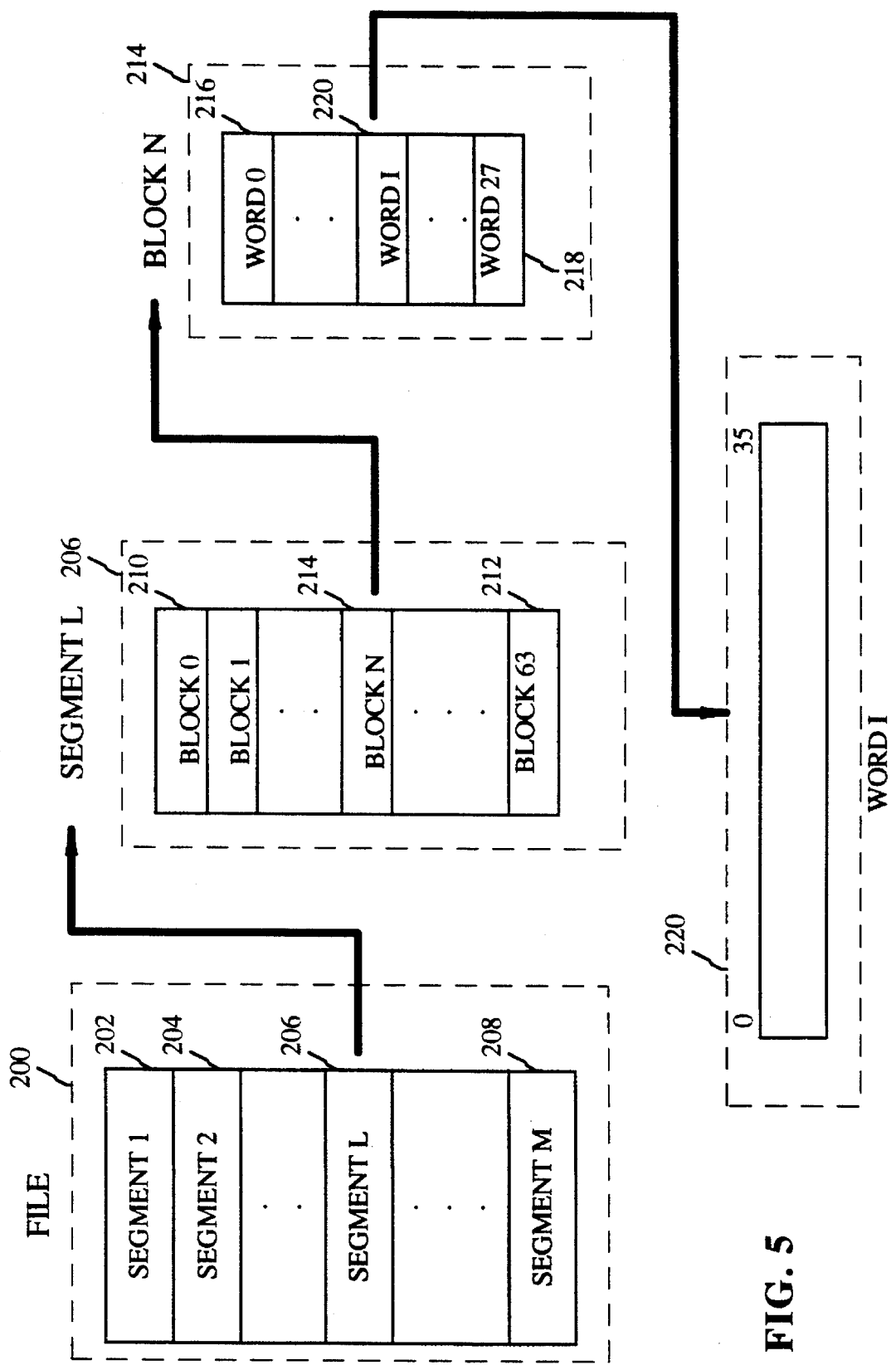

FIG. 5 shows the details of the Host file format hierarchy.

Figure 6:
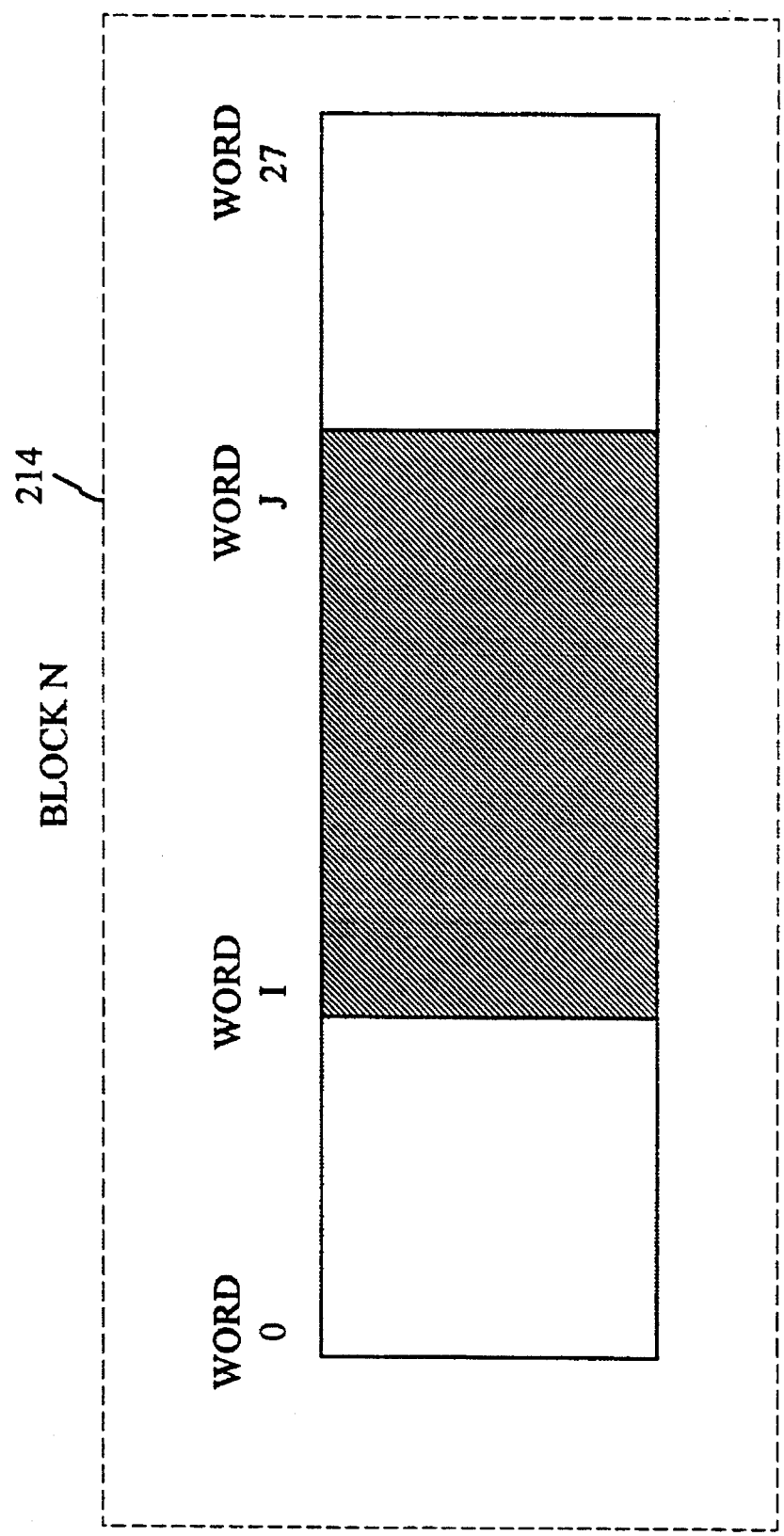

FIG. 6 illustrates a partial block update of words within one block.

Figure 7:
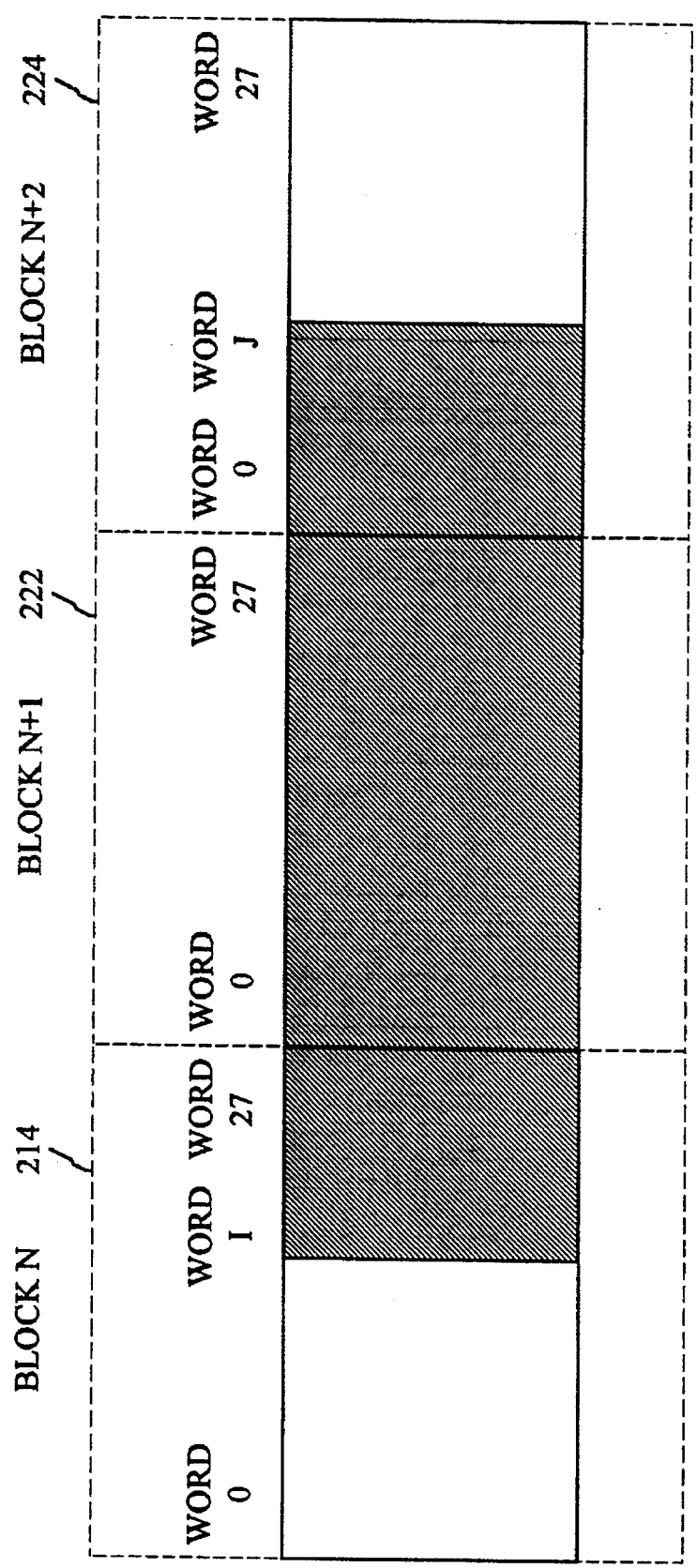

FIG. 7 illustrates a partial block update of words spanning more than one block.

Figure 8:
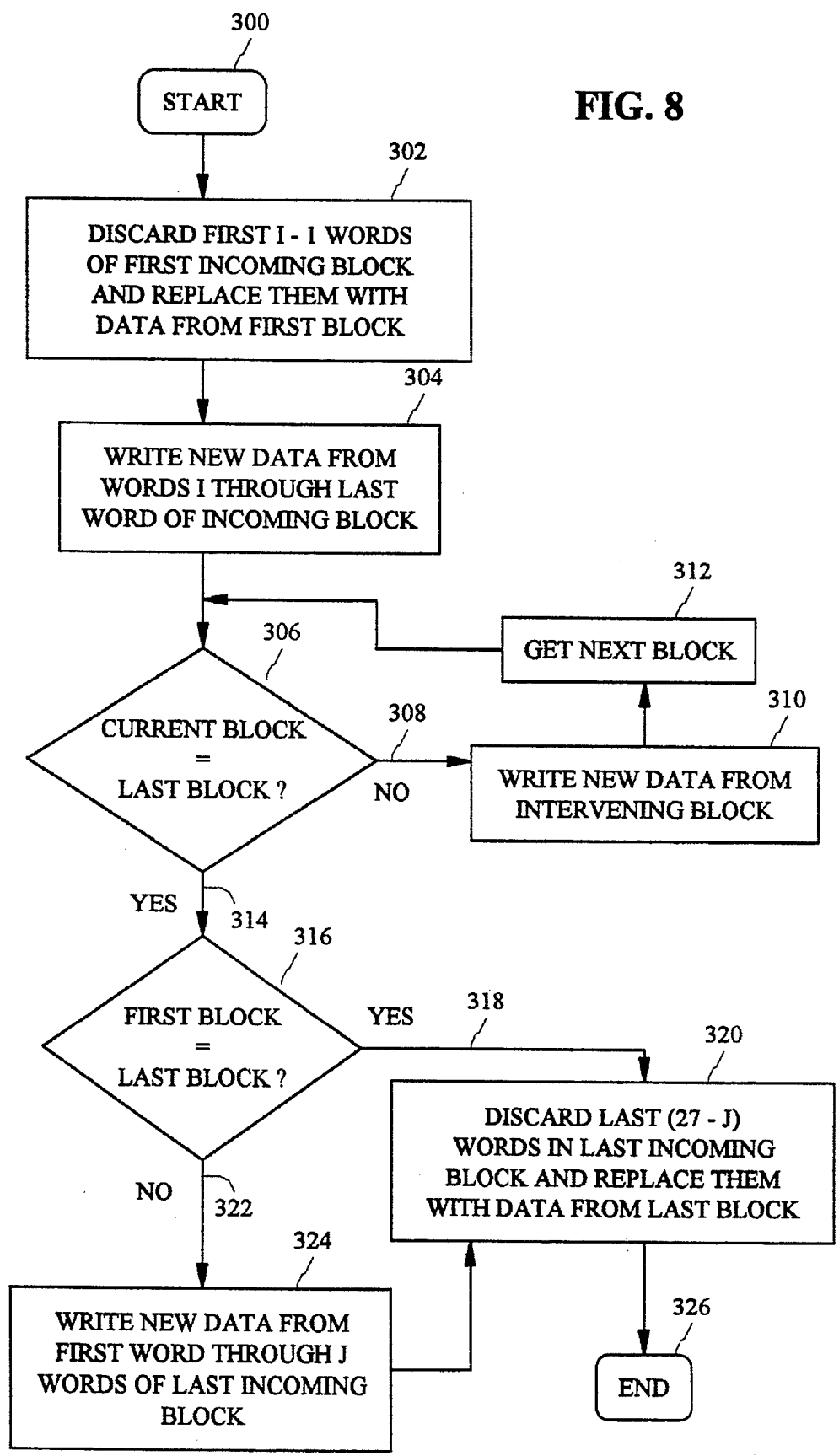

FIG. 8 is a flow chart showing the steps to perform a partial block update of file cache data.

Figure 9:
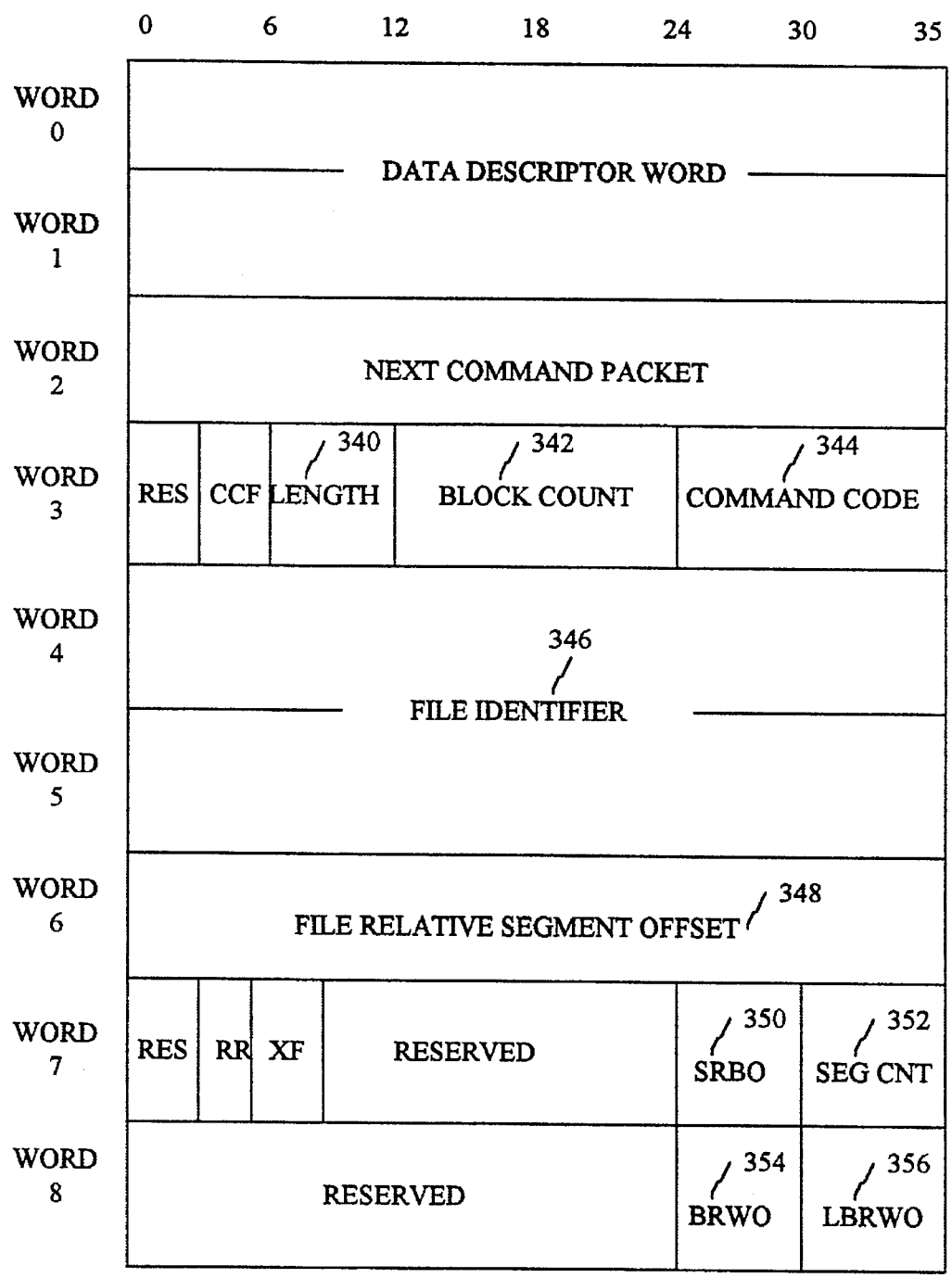

FIG. 9 shows the format of the Write Off Block Boundary command.

Figure 10:
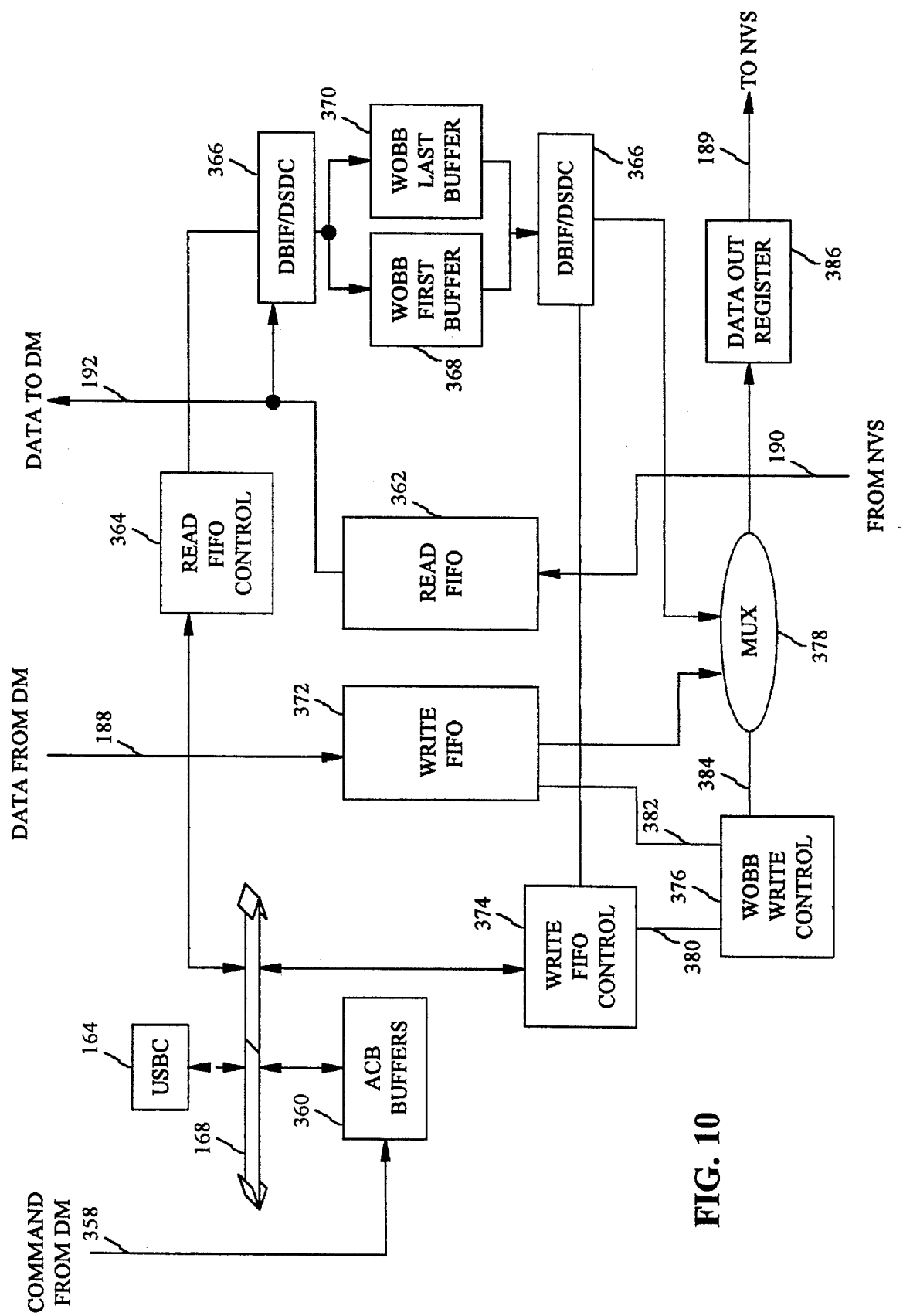

FIG. 10 is a block diagram showing the components of the Host Interface Adaptor used to perform a partial block update.

Figure 11:
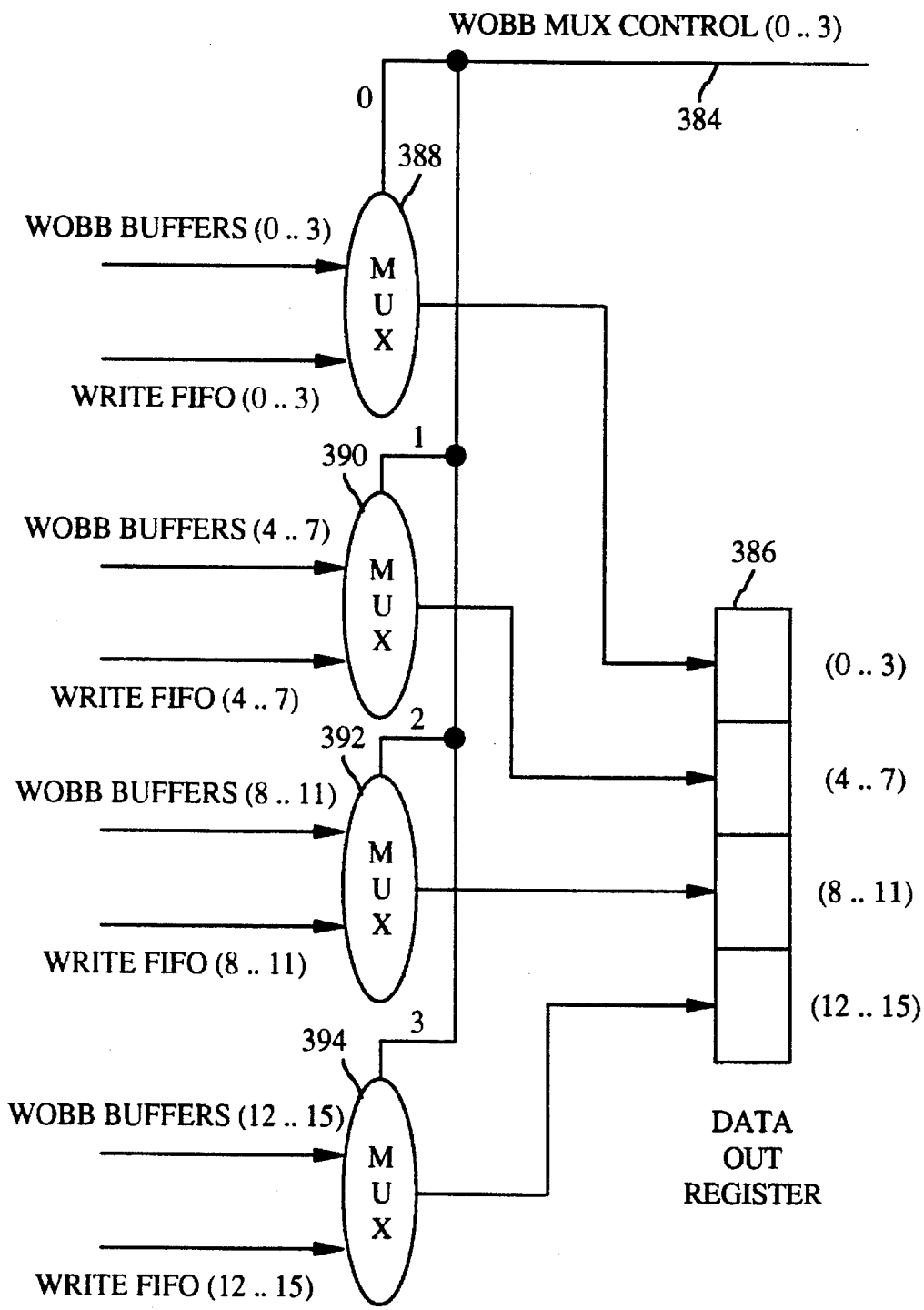

FIG. 11 is a block diagram showing the details of the merging of WOBB data.

Figure 12:
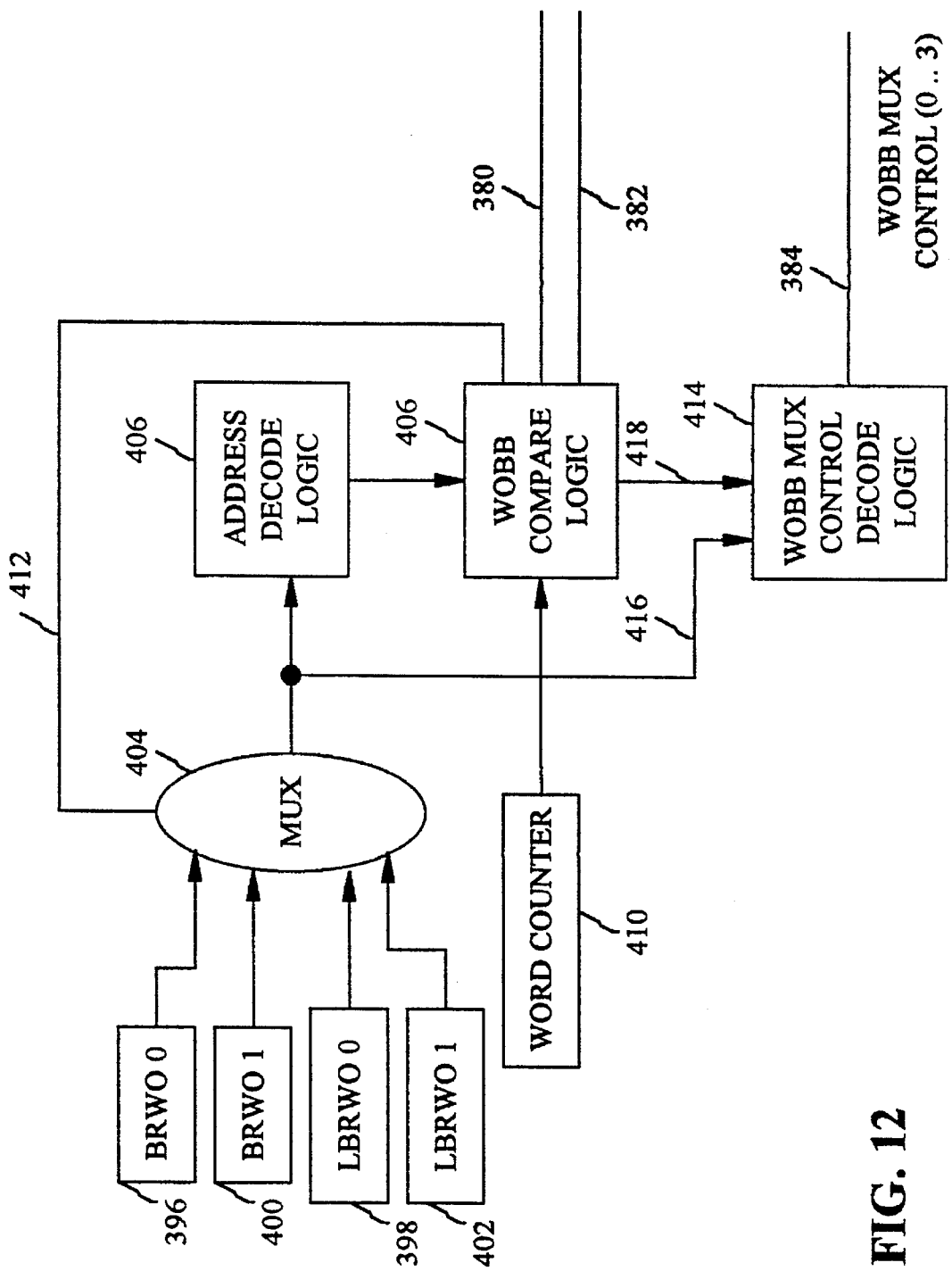

FIG. 12 is a block diagram showing the details of the WOBB Write Control logic.

Figure 13:
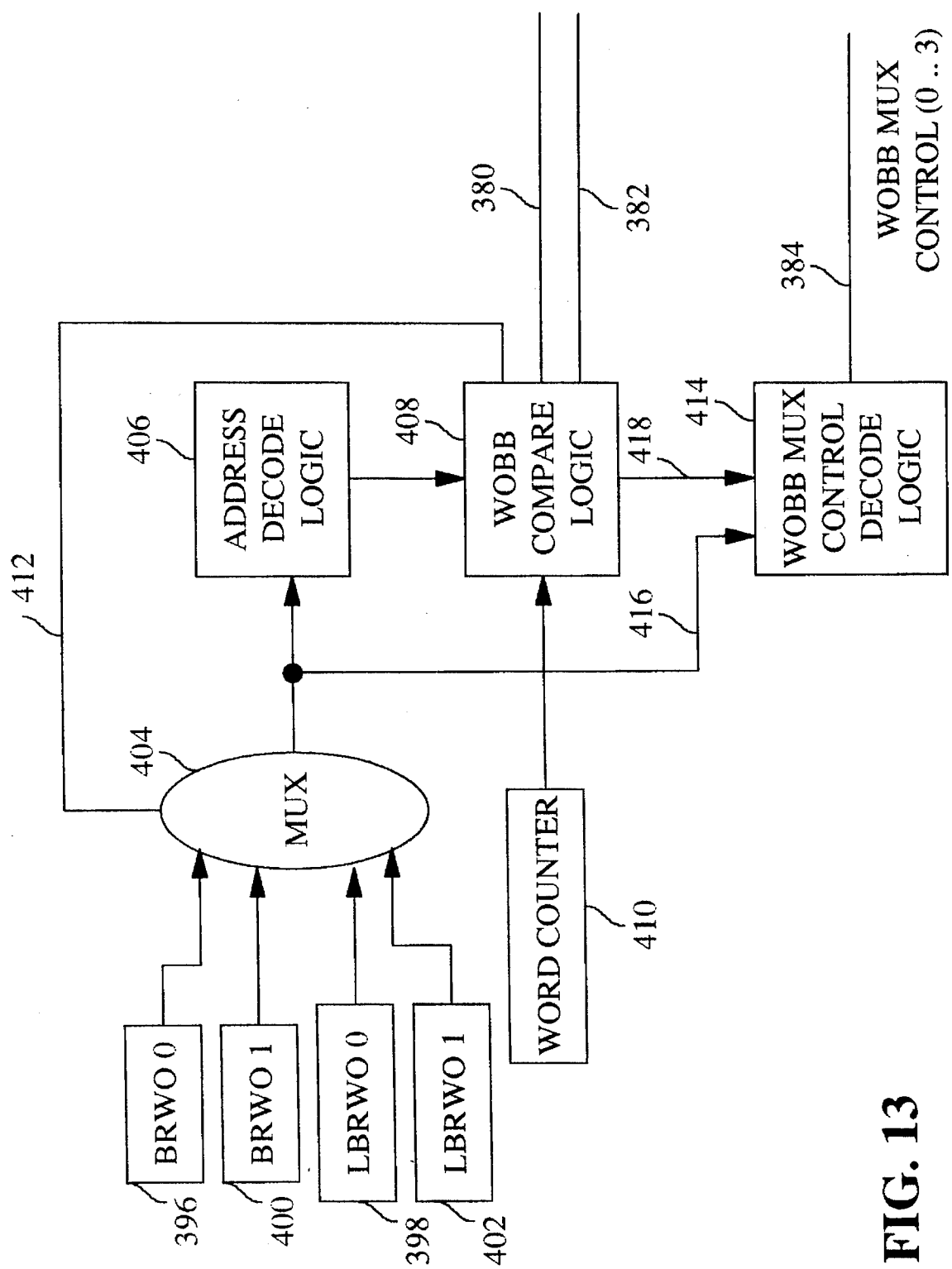

FIG. 13 is a diagram of the WOBB Compare Logic.

Figure 14:
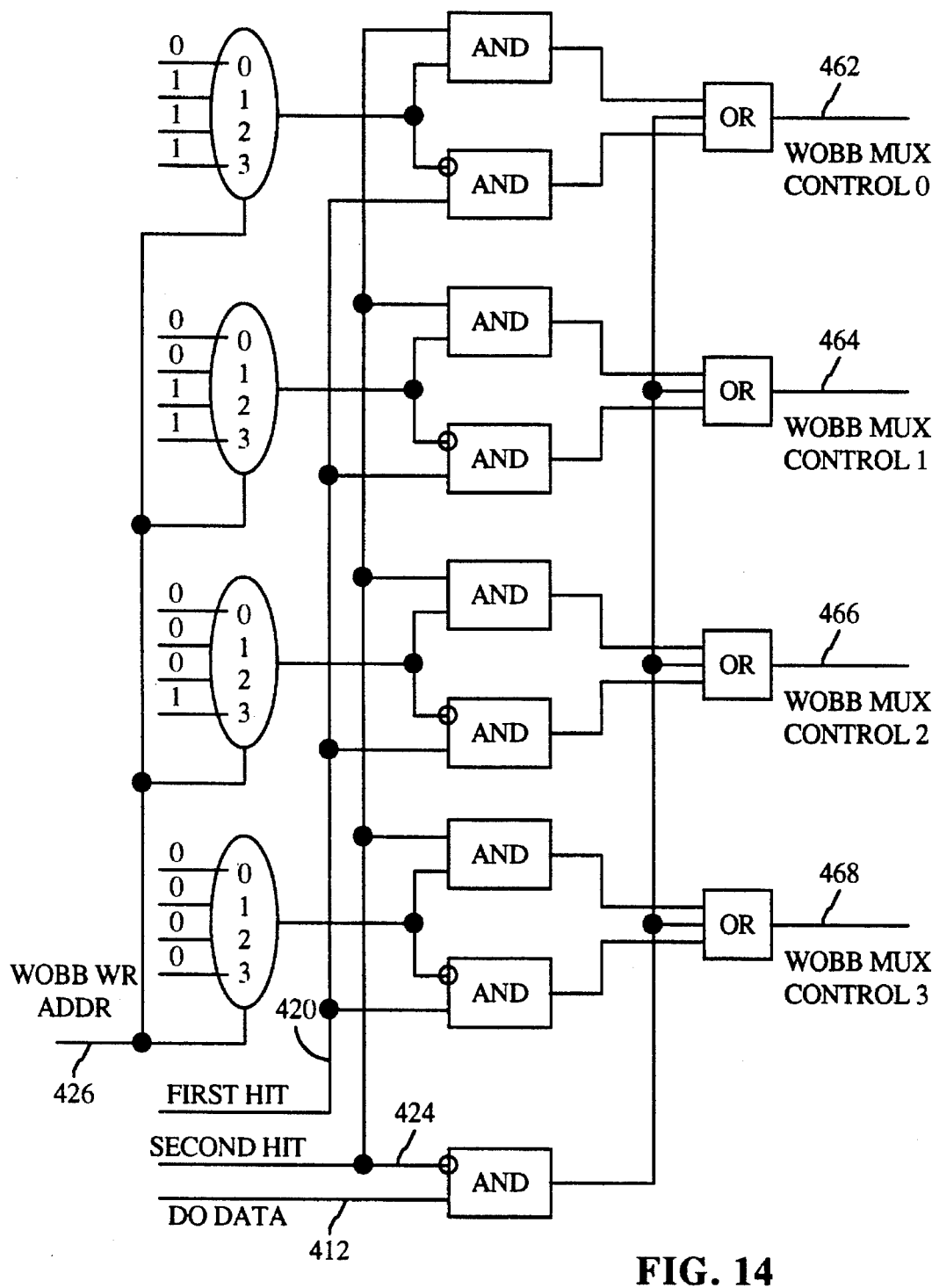

FIG. 14 is a diagram of the WOBB MUX Control Decode Logic.

DESCRIPTION OF THE PREFERRED EMBODIMENT

I. System Architecture Overview

Figure 1:
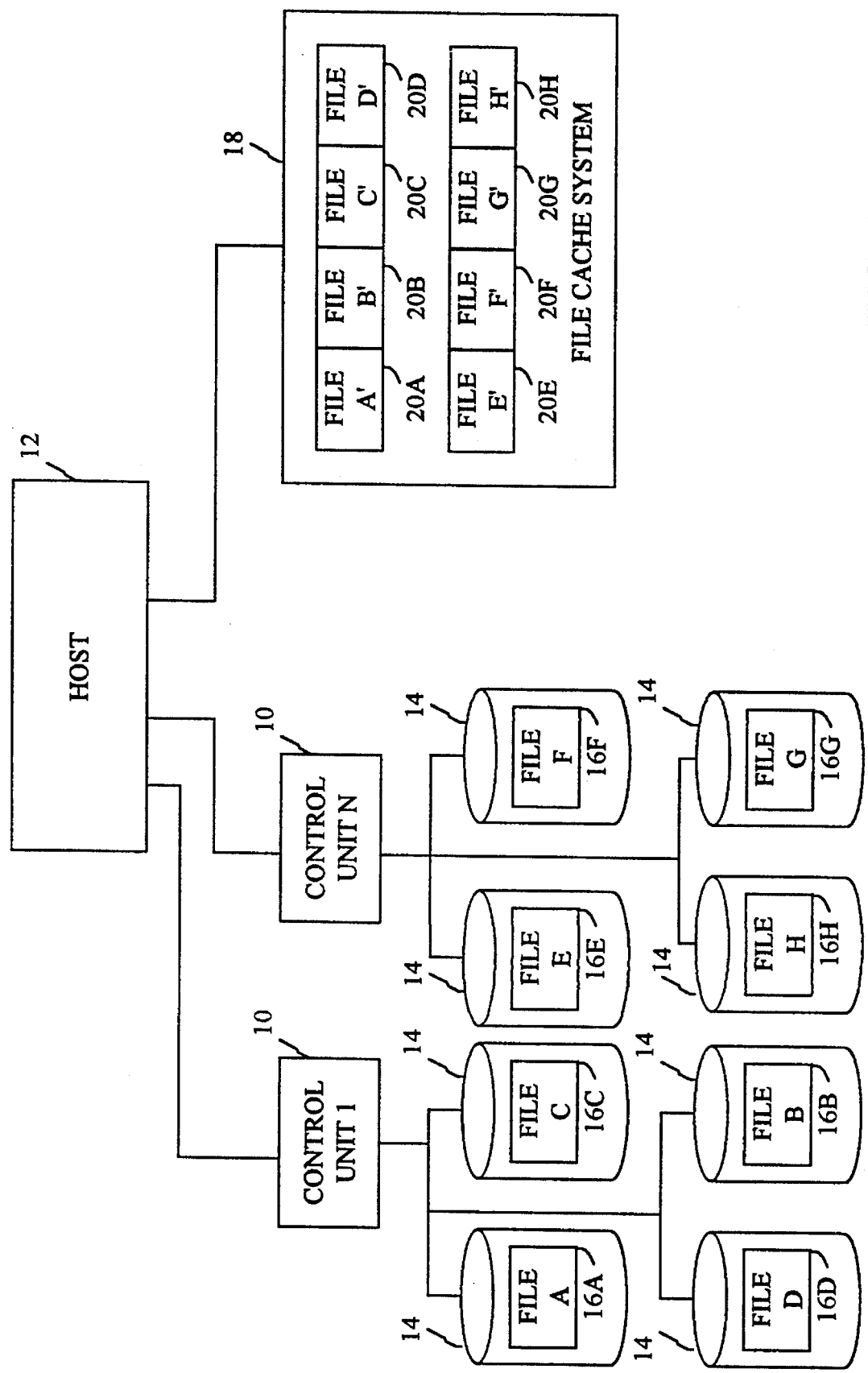
FIG. 1 illustrates the environment in which this invention operates.

FIG. 1 illustrates the environment in which this invention operates. In a typical large computer system, a plurality of Control Units 10 are coupled to a Host computer 12 for providing access to multiple mass storage Disks 14. In the preferred embodiment, the Host 12 is a 2200 Series computer system available from the assignee of this invention. Application and system software executing on Host 12 reads data from and writes data to Files 16A–H, which are stored on Disks 14. While Files 16A–H are depicted as blocks it should be understood that the data is not necessarily stored contiguously in Disks 14.

The File Cache System 18, of which the subject invention is a part, provides an intermediate storage capability for the Host 12 with a greatly improved file access time and resiliency against data loss which is comparable to Disks 14. The File Cache System is more fully described in co-pending application Ser. No. 08/174750 and reference may be made to that application for a complete description of a system in which the present invention may be utilized. All or parts of active Files 16 may be stored in the File Cache System 18 depending on the storage capacity of the File Cache System 18, and the size and number of Files 16 selected by the system software on the Host 12 to be cached.

The portion of Files 16 that are stored in the File Cache System 18 are shown as blocks 20A-H. The cached portion of Files 16 are labelled File A', File B', . . . , File H' for discussion purposes. File A' 20A is the portion of File A that is stored in File Cache System 18; File B' 20B is the portion of File B that is stored in File Cache System 18; and so on. The existence of the File Cache System at this level of the storage hierarchy allows references to cached files to be immediately directed to the File Cache System for processing, in contrast to references to non-cached files where an Input/Output (I/O) channel program must be constructed on the Host 12 to access the proper Disk 14 via a Control Unit 10. The implementation of the File Cache System 18 reduces the path length that a request must travel in order to update a File 16. This reduced path length, coupled with the powerful processing capabilities of the File Cache System 18, results in shortened File access times.

FIG. 2 is a flow chart showing how file accesses are accomplished within the File Cache System. The processing begins at Step 22 where application software executing on Host 12 requests access to a selected File. The access request may be a request to read data from or write data to the selected File.

A File access request is sent to the File Cache System 18 at Step 24. The File access request contains a File identifier (ID), which specifies the File on which the read or write operation is to be performed; an offset from the beginning of the File, which specifies precisely where in the File the operation is to begin; and the quantity of data which is to be read from or written to the File. At Test 26, the File Cache System 18 uses the File ID, offset, and quantity to determine if the requested File data is already present in the File Cache System. If the requested File data is not present, then Path 28 is followed to Step 30, and the File Cache System 18 "stages"(reads) the requested File data from the appropriate File 16 on Disk 14 to the cached File 20 in the File Cache System. If the requested File data is present, Path 32 is followed to Step 34 where the File Cache System grants access to the requested File data.

FIG. 3 is a functional block diagram of the hardware and software components of the File Cache System. The system is comprised of hardware and software elements in both the Host 12 and File Cache System 18. The software on Host 12 is shown by blocks 36, 38, 40, and 42. The blocks are joined to signify the interrelationships and interfaces between the software elements.

Application Software (APP SW) 36 provides data processing functionality to Host system 12 end users and includes applications such as financial transaction processing and airline reservations systems. Data bases maintained by Application Software 36 may be stored in one or more of the exemplary Files 16 as shown in FIG. 1. File Management Software (FM SW) 38, Input/Output Software (IO SW) 40, and File Cache Handler Software (FCH SW) 42 are all components of the Host's operating system software (not shown). In general, File Management Software 38 provides management of file control structures, and in particular handles the creating, deleting, opening, and closing of files.

Input/Output Software 40 provides the software interface to each of the various I/O devices coupled to the Host 12. The I/O devices may include network communication processors, magnetic disks, printers, magnetic tapes, and optical disks. Input/Output Software 40 builds channel programs, provides the channel programs to the appropriate I/O processor function within the Host 12, and returns control to the requesting software at the appropriate time.

File Cache Handler Software 42 coordinates the read and write accesses to cached files. In general, File Cache Handler Software 42 provides the operating system level interface to the File Cache System 18, "stages" (reads) File data from Disks 14 to the File Cache System 18, and "destages" (writes) File data from the File Cache System 18 to Disks 14. The File Cache Handler Software 42 provides File data and File access requests to the hardware interface to the File Cache System 18 via Main Storage 44. Main Storage 44 is coupled to an I/O bus called the M-Bus 46.

The Data Mover (DM) components 48, 50 provide the hardware interface to the File Cache System 18. While two DMs 48, 50 are shown, the system does not require two DMs for normal operations. A configuration with two DMs provides fault tolerant operation; that is, if one DM fails, the other DM is available to process File access requests. In alternate embodiments, there could be many DMs. Each DM 48, 50 is coupled to the M-Bus 46 of Host 12. File Cache Handler Software 42 distributes File access requests among each of the DMs 48, 50 coupled to M-Bus 46. If one DM fails, File access requests queued to that DM can be redistributed to the other DM.

The DMs 48, 50 perform the same general functions as an I/O processor, that is, they read data from and write data to a peripheral device. The DMs can also read from and write to Main Storage 44 via the M-Bus 44. The DMs 48, 50 coordinate the processing of File access requests between File Cache Handler Software 42 and the File Cache System 18 and transfer File dam between Main Storage 44 and the File Cache System 18. Each of the DMs is coupled to a Host Interface Adapter (HIA) 52, 54 component within the File Cache System 18. DM 1 48 is coupled to HIA 1 52 by a Fiber Optic Interface shown as Line 56, and DM 2 50 is coupled to HIA 2 54 by a second Fiber Optic Interface shown as Line 58.

The File Cache System 18 is configured with redundant power, redundant clocking, redundant storage, redundant storage access paths, and redundant processors for processing File access requests, all of which cooperate to provide a fault tolerant architecture for storing File data. The File Cache System 18 is powered by dual Power Supplies, Power 1 60 and Power 2 62. The portion of the File Cache System 18 to the left of dashed line 64 is powered by Power 1 60 and is referred to as Power Domain 1, and the portion of the File Cache System to the right of dashed line 64 is powered by Power 2 62 and is referred to as Power Domain 2. Each of the Power Supplies 1 and 2 has a dedicated battery and generator backup to protect against loss of the input power source.

Two separately powered Clocks 1 66 and 2 68 provide timing signals to all of the components of the File Cache System 18. Clock 1 66 provides timing to the components within Power Domain 1 and Clock 2 68 provides timing to the components within Power Domain 2. Redundant oscillators within each Clock provide protection against the failure of one, and Clocks 1 and 2 are synchronized for consistent timing across Power Domains 1 and 2.

The Non-Volatile Storage (NVS) component 70 includes multiple dynamic random access memory (DRAM) storage modules. Half of the storage modules are within Power Domain 1 and the other half are within Power Domain 2. The data stored in the storage modules in Power Domain 2 is identical to the data stored in storage modules in Power Domain 1. Thus, NVS 70 provides for the redundant storage of File data 20 and the control structures used by the File Cache System 18. The redundant storage organization supports both single and multiple bit error detection and correction.

The portion of NVS 70 within each of the Power Domains 1 and 2 is coupled to two Storage Interface Controllers (SICTs) 72, 74. While only two SICTs are shown in FIG. 3, each half of NVS 70 is capable of being addressed by up to four SICTs. Line 76 represents the coupling between SICT 1 72 and the portion of NVS 70 within each of Power Domains 1 and 2. Similarly, Line 78 represents the coupling between SICT 2 74 and NVS 70.

Read and write requests for NVS 70 are sent to the SICTs 72, 74 via local network Street 1 80 and Street 2 82. The Street provides data transfer and interprocessor communication facilities between the major components within the File Cache System 18. The Streets provide multiple requesters (HIA 1 52, HIA 2 54, Index Processor (IXP) 1 84, or IXP 2 86) with high-speed, high-bandwidth access to NVS 70, as well as multiple paths for redundant access. Crossover 88 provides a path whereby NVS 70 requests may be sent from Street 1 80 to Street 2 82, or visa versa, if a SICT 72.74 is unavailable. For example, if SICT 1 72 fails, NVS requests sent from requesters (HIAs and IXPs) are sent to Street 2 82 via Crossover 88, whereby NVS 70 access is provided by SICT 2 74.

The HIAs 52, 54 perform functions in the File Cache System 18 which are similar to the functions performed by the DMs 48, 50 on the Host 12. In particular, the HIAs receive File access requests sent from the DMs, write File data sent from the Host 12 to NVS 70, and read File data from NVS and send it to the Host. The HIAs also contain the logic for sending and receiving data over the Fiber Optic Interfaces 56, 58. HIA 1 52 interfaces with Street 1 80 over Line 90, and HIA 2 54 interfaces with Street 2 82 over Line 92.

Index Processor (IXP) 1 84 and IXP 2 86 manage allocation of the storage space available in NVS 70, service file access requests sent from Host 12, and generally provide for overall File Cache System management.

FIG. 4, comprising FIG. 4(A) and FIG. 4(B), is a detailed block diagram showing the components of a Data Mover and a Host Interface Adaptor. The DM and HIA exist as a pair because they are opposing ends of a communications path. The DM component 48 and the HIA component 52 are each instances of the Microsequencer Bus Controller (USBC) System. The DM 48 interfaces with the M-Bus 46 on the Host 12. The DM also communicates with the HIA 52 over Fiber Optic Interface 56. Thus, the DM and the HIA may be physically located some distance apart from each other, the actual distance being dependent on the length of the Fiber Optic Interface 56. The HIA 52 interfaces over Lines 90 to the Street 80.

FIG. 4(A) shows the components of a Data Mover. The architecture of the DM 48 as an instance of a Microsequencer Bus Controller System shows that there are two Microsequencer Bus Controllers (uSBCs) 94, 96 connected to a Control Store (CS) 98 via Lines 100, 102. The uSBC 0 94 and uSBC 1 96 are Reduced Instruction Set (RISC) microprocessors that control various special purpose gate arrays called Stations over the Micro Bus 104. The Micro Bus 104 is a bidirectional communications bus. The uSBCs support an instruction set with seven basic instructions in it. The instructions are of fixed length and specify either one or two operands only. The internal circuitry of the uSBCs is "hard-wired", i.e., it is not microprogrammed. The results from operations performed by uSBC 1 96 are transferred to uSBC 0 94 for error detection purposes over Line 99. The Control Store 98, consisting of seven static random access memories (SRAMs), is used to store an instruction stream that the uSBCs execute in parallel.

The M-Bus Controller (MBCT) Station 106 handles M-Bus 46 arbitration and controls data transfers between other DM Stations and the M-Bus 46. There are two DM Stations to transfer data to the M-Bus 46 and two DM Stations to transfer data from the M-Bus. The M-Bus Write (MBWR) 0 108 and MBWR 1 110 Stations receive data from the M-Bus 46 via Lines 112 and 114, respectively. The M-Bus Read (MBRD) 0 116 and MBRD 1 118 Stations send data to the M-Bus 46 via Lines 120 and 122 respectively. The MBCT 106 controls the access of these DM Stations to the M-Bus 46 over an interface (not shown) separate from the Micro Bus. Data is passed from MBWR 0 108 and MBWR 1 110 via Lines 124 and 126 to the Send Frame Transfer Facility (SEND FXFA) gate array 128. The SEND FXFA 128 packages the data into transmission packets called frames, which are passed over Line 130 to the Light Pipe Frame Control (LPFC) gate array 132. The LPFC 132 sends the frame over Lines 134 and 136 to dual PLAYER+ Physical Layer Controllers, consisting of PLAYER+0 138 and PLAYER+1 140, which are commercially available from National Semiconductor Corporation. The PLAYER+0 138 and PLAYER+1 140 transmit frames over Fiber Optic Links 142 and 144 to the HIA 52.

When the HIA 52 sends frames to the DM 48, PLAYER+0 138 and PLAYER+1 140 receive the frames over Fiber Optic Links 146 and 148. The PLAYER+0 138 component forwards its frame over Line 150 to the LPFC 132. Similarly, the PLAYER+1 140 component forwards its frame over Line 152 to the LPFC. The LPFC sends the frames via Line 154 to the Receive Frame Transfer Facility (REC FXFA) gate array 156, which unpacks the data and stores it in MBRD 0 116 and MBRD 1 118 via Line 158. The REC FXFA 156 sends an acknowledgment for the data transfer to the SEND FXFA 128 over Line 162.

FIG. 4(B) shows the components of a Host Interface Adaptor. The architecture of the HIA 52 as an instance of a Microsequencer Bus Controller System shows that there are two uSBCs 164, 166 connected to a Control Store 168 via Lines 170, 172, respectively. The uSBCs 164, 166 access the HIA Stations via the Micro Bus 168. The PLAYER+0 174 and PLAYER+1 176 components receive frames over Fiber Optic Links 142 and 144, respectively. PLAYER+0 174 forwards its frame to LPFC 178 over Line 180. Similarly, PLAYER+1 176 forwards its frame to LPFC 178 over Line 182. The LPFC 178 transfers the frames to the Receive Frame Transfer Facility (REC FXFA) 183 over Line 184. The REC FXFA 183 unpacks the frames and stores control information in the Request Status Control Table 0 (RSCT) 185 and the RSCT 1 186 Stations via Line 188. The RSCT 0 and RSCT 1 Stations monitor the data that has been received from the DM 48. The data which was contained in the frame received by the REC FXFA 183 is sent to the Database Interface (DBIF) Station 187 over Line 188. The DBIF 187 forwards the data over Line 189 to the Street 1 80.

Data received by the DBIF 187 over Line 190 from the Street 1 80 is sent to the Send Frame Transfer Facility (SEND FXFA) 191 via Line 192. Control information received over Line 190 from the Street 1 80 is sent to RSCT 0 185 and RSCT 1 186 over Line 193. The SEND FXFA 191 takes this data and control information from RSCT 0 185 and RSCT 1 186 via Line 194 and formats a frame for transmission by the LPFC 178. Acknowledgements from REC FXFA 183 are received by SEND FXFA 191 over Line 195. The frame is forwarded over line 196 to the LPFC 178. The LPFC 178 creates two frames from the frame it received and sends one frame to PLAYER+0 174 over Line 197 and the other frame to PLAYER+1 176 over Line 198. The frames are then transmitted over the Fiber Optic Links 146 and 148 to the DM 48. The uSBCs 94, 96, 164, 166 and the Micro Busses 104, 168 manipulate data in the system according to a hardware mode pin setting. When the mode pin is set, the Microsequencer Bus Controller System instance is a DM 48 operating on 36-bit data words in communicating with its Stations. When the mode pin is clear, the Microsequencer Bus Controller System is a HIA 52 operating on 32-bit data words in communicating with its Stations.

I. Partial Block Updates

Referring back to FIG. 3, when "staged" portions of Files (which are resident in the File Cache System 18) need to be modified by the Host 12 software, the FCHSW 42 sends a command, via the DM 48, to the HIA 52. This command directs the HIA 52 to update the NVS 70 as specified. Most accesses to the NVS 70 are performed on a block by block basis. That is, the FCHSW 42 requests an update of a whole block of data in the NVS and provides all 28 36-bit words. Occasionally, the FCHSW only needs to update a fraction of a block with new data. One way of performing this partial block update operation would be to read the desired block from the NVS 70 in the File Cache System 18 all the way back to FCHSW 42 on the Host 12, modify the requisite portion of the block with the new data while preserving the other data in the block, and to write the entire updated block back to the NVS 70. This method is relatively slow because of the multiple transfers, fixed size of data transfer, and necessary software interaction.

The present invention solves these problems by providing the capability for the FCHSW 42 to specify and send the new data for a file cache update without having to merge the old data with the new data. The FCHSW 42 always sends an entire block to the HIA 52, but the FCHSW only needs to write the new data into the block being sent. The rest of the block is ignored by the HIA 52 when it is merging the old data fetched from the NVS 70 with the new data just received. Therefore, the invention allows partial block updates of file data into the NVS 70 where the amount of data written may be any portion of a block, including a single word. The HIA 52 controls the merging of the preexisting data in the referenced block with the new data received from the Host and writes the updated block back to the NVS 70. The file cache update is thereby localized to the HIA hardware. No further interaction is needed with the software on the Host system. Thus, the speed of the file cache update in these situations is greatly increased.

In the preferred embodiment, Files resident on the Host 12 system are structured as follows. FIG. 5 shows the details of the Host file format hierarchy. A File 200 may contain one or more units of storage called segments. In the example shown in FIG. 5, the File 200 contains M segments, numbering from Segment 1 202, Segment 2 204, . . . Segment L 206, to Segment M 208. Each segment is composed of 64 blocks. Thus, Segment L 206 contains Block 0 210 through Block 63 212. Each block contains 28 words. These words are numbered sequentially starting with zero and ending with 27. Zero specifies the first word in the block and 27 specifies the last word. For example, Block N 214 of Segment L 206 contains Word 0 216 through Word 27 218. Each word contains 36 bits. Thus, for some Word I 220 in Block N 214, 36 bits of data are stored. One can easily see that to reference any given location in a File, the Segment number, Block number and word number must be known. Words of data in the File Cache System 18, however, contain only 32 bits. Thus, a mapping of 36-bit data words from the Host to 32-bit data words must take place when File data is stored in the NVS 70 of the File Cache System 18.

There are two cases to be considered for partial writes of File data. FIG. 6 illustrates a partial block update of words within one block. Here, the HIA 52 is instructed to write new data from Word I to Word J of Block N 214. The number of words to be written is J−I+1. For this case, this number must be less than or equal to 28. Notice that if I=J, then only one word in the block is to be updated. FIG. 7 illustrates a partial block update of words spanning more than one block. Here, the HIA 52 is instructed to write the new data from Word I through Word 27 of Block N 214. Next, new data is written into zero or more entire blocks. In the present example, there is one intermediate block, labelled Block N+1 222. There may, however, be multiple intermediate blocks. Finally, new data is written from Word 0 through Word J of Block N+2 224.

FIG. 8 is a flow chart showing the steps to perform a partial block update of file cache data. These steps are performed by the HIA 52 hardware in controlling the usage of the blocks of data received from the Host 12. Initially, the HIA 52 receives a command from the Host 12 which specifies the parameters of the partial block update operation. The HIA 52 then fetches the first and last blocks of file data referenced by the command from the NVS 70 and stores this data in a temporary storage (note that the first block is also the last block when only one block is specified). The HIA controls the flow of data back to the NVS 70, merging the existing data in the temporary storage with the new data arriving from the Host 12.

After Start step 300, the HIA, at Step 302, discards the first I–1 words of the first incoming block of data received from the Host 12. Instead, existing data previously fetched written into the temporary storage is written back to the NVS 70 at the specified location. Thus, the first I–1 words are replaced with data from the first block previously fetched from the NVS 70. Next, at Step 304, the HIA writes the new data from Word I through the last word of the incoming block into the NVS 70. If the current block being processed is not the last block (Step 306), then the No path 308 is taken to Step 310. This means that this operation is referencing multiple blocks. If the last block is not being processed yet, the HIA writes the new data received from the Host in the intervening block into the NVS. All words in the intervening block are transferred. At Step 312, the next block is obtained from the Host. This process of transferring complete intervening blocks repeats until the current block is indeed the last block in the data transfer.

If the current block is the last block, then the Yes path 314 is taken to Step 316. If the first block was the last block (i.e., there was only one block of data to transfer), then the Yes path 318 is taken to Step 320. At this step the HIA discards the last (27 - J) words in the last incoming block. Instead, this data is replaced with corresponding data from the last block previously fetched from the NVS. This replacement data is then written to the NVS. If the first block was not the last block (i.e., this is a multi-block data transfer), then the No path 322 is taken to Step 324. At Step 324, the HIA writes the new data from the first word through Word J of the last incoming block into the NVS. Next, the HIA performs Step 320 as described above to write the last (27 - J) words of the block. Processing ends at Step 326.

The command that is sent to the HIA 52 to implement this partial block update capability is called the Write Off Block Boundary (WOBB) command. It is part of the File Cache System 18 architecture specification as described in the related application entitled "Outboard File Cache System." A WOBB command is sent from the FCHSW 42 through the DM 48 to the HIA 52. Each WOBB command can update from one to 28 words in a block. It can also update one or more complete blocks. FIG. 9 shows the format of the WOBB command.

The relevant parameters of the WOBB command for purposes of explaining the present invention are as follows. The Length field 340 contains the number of words contained in this command after Word 3. The Block Count field 342 contains the number of blocks of data to be transferred as a result of the command's execution. The Command Code 344 indicates that this is a WOBB command. The File Identifier 346 is the name of the file being referenced. The File Relative Segment Offset (FRSO) field 348 selects the segment, relative to the start of the file, within the identified file where the update is to occur. The Segment Relative Block Offset (SRBO) field 350 denotes the first block, relative to the start of the segment addressed by the command. This field is analogous to the value N in FIG. 6. The Segment Count (SEG CNT) field 352 holds the number of segments that are addressed by this command. The Block Relative Word Offset (BRWO) field 354 represents the first word of the file update, relative to the start of the block addressed by the SRBO field 350. Finally, the Last Block Relative Word Offset (LBRWO) field 356 represents the last word of the file update, relative to the start of the last block addressed by this command.

FIG. 10 is a block diagram showing the components of the Host Interface Adaptor used to perform a partial block update. This figure illustrates the data and control flow of the WOBB command. First, a WOBB command 358 is received from the DM 48 for a specified Activity Control Block (ACB). An ACB is a list of requested operation on file data. These ACBs are stored in the ACB Buffers 360, which are resident in RSCT 0 185 and RSCT 1 186. The Microsequencer Bus Controller (uSBC) 164 accesses the WOBB command in an ACB Buffer 360 over the Micro Bus 168. The uSBC 164 prepares the execution of the WOBB command by setting up a Read First-In-First-Out (FIFO) buffer 362 resident on the DBIF 187 via Read FIFO Control logic 364. This Read FIFO Control logic 364, also resident on the DBIF 187, manipulates the DBIF/Data Source Disk Controller (DSDC) (not shown) interface 366.

If the WOBB command specifies a multiple block write (as shown in FIG. 7), then the first and last blocks in the proposed update are set up in the Read FIFO 362 for a read operation from NVS 70. The first and last blocks are read from NVS 70 over Line 190 and temporarily stored in the Read FIFO 362. These blocks are then transferred via the DBIF/DSDC Interface 366 to the WOBB Buffers. The WOBB Buffers are resident on the DSDC (not shown). The first block's data is put into the WOBB First Buffer 368. The last block's data is put into the WOBB Last Buffer 370.

The uSBC 164 then prepares a command to set up the Write FIFO buffer 372. Write FIFO Control logic 374 receives the parameters for the partial block update from the uSBC 164 over the Micro Bus 168. The Write FIFO Control logic 374 is used to set up the boundaries of the write operation for the partial block updates and also manages the DBIF/DSDC Interface 366 with the WOBB First Buffer 368 and the WOBB Last Buffer 370.

The data arrives from the DM 48 over Line 188 and is buffered in the Write FIFO 372. When new data is flowing through the Write FIFO 372, WOBB Write Control logic 376 merges pre-existing data in stored in the WOBB First Buffer 368 and the WOBB Last Buffer 370 with the new data via Multiplexor 378 according to the steps discussed above. The WOBB Write Control logic 376 uses information from the Write FIFO Control logic 374 over Line 380 and the Write FIFO 372 over Line 382 to control the merge. This information includes the Block Relative Word Offset 354, the Last Block Relative Word Offset 356, and other processing status indicators. WOBB MUX Control indicators are sent to the MUX 378 over Line 384. The merged data is sent via the Data Out Register 386 over Line 189 to the NVS 70.

FIG. 11 is a block diagram showing the details of the merging of WOBB data. WOBB MUX Control signals are input over Line 384. These signals consist of four master-bitted flags which control the flow of data from either the Write FIFO 372 or the WOBB Buffers. Control is exercised at the nibble level, where a nibble consists of four bits. Data transfers are accomplished by sending 16-bit values to the NVS 70. Therefore, the WOBB MUX Control signals feed four Multiplexors 388, 390, 392, and 394 as shown. MUX 378 on FIG. 10 is representative of these four Multiplexors. Each of the four WOBB MUX Control bits selects one nibble of data. For example, if WOBB MUX Control signal 0 is high, then bits 0–3 of the current word in the Write FIFO 372 is allowed to pass to the Data Out Register 386. If WOBB MUX Control signal 0 is low, then bits 0–3 of the current word in the appropriate WOBB Buffer (First or Last) is allowed to pass to the Data Out Register. Similarly the other three WOBB MUX Control signals control the merging of Write FIFO (new) and WOBB Buffer (old) data.

These WOBB MUX Control signals are generated by the WOBB Write Control logic 376. FIG. 12 is a block diagram showing the details of the WOBB Write Control logic. The WOBB Write Control logic 376 can handle two different requests to perform partial block updating at a time. The parameters for these updates are stored in Block Relative Word Offset (BRWO) 0 396 and Last Block Relative Word Offset (LBRWO) 0 398, and BRWO 1 400 and LBRWO 1 402. These values are obtained from WOBB commands via the Write FIFO Control logic 374. These 5-bit values are input to Multiplexor (MUX) 404. Initially, one of the BRWOs is selected and input to Address Decode Logic 406.

Address Decode Logic 406 translates the 5-bit value indicating a 36-bit word within a 28-word block into a 6-bit value indicating the current 16-bit word within a 64-word block. Recall that the unit of storage in the NVS is 32-bit words. Thus, the Address Decode Logic 406 controls the addressing of 4-bit nibbles of the incoming data streams in order to map the 36-bit words into two 16-bit half-word data transfers. WOBB Compare Logic 408 uses the current value of the Word Counter 410, control signals from Write FIFO Control 374 via Line 380, and control signals from Write FIFO 372 via Line 382 to determine if the first 16-bit half-word in the block has been processed. If the first half-word has been processed, then WOBB Compare Logic 408 causes the MUX 404 to select the appropriate LBRWO for use in all subsequent references in this partial block update. The LBRWO is needed to determine when the last word in the block has been processed. The control signal sent to the MUX 404 is called DO Data 412. The Word Counter 410 is a 6-bit value used to count up to 64 16-bit half-words being processed for the current block.

WOBB MUX Control Decode Logic 414 uses the lower two bits of the 5-bit BRWO value from Line 416 and three control signals (described below) from WOBB Compare Logic 408 via Line 418 to construct the four-bit nibble mask (called the WOBB MUX Control (0 . . . 3) signals) used in the merge operation shown in FIG. 12.

FIG. 13 is a diagram of the WOBB Compare Logic. This logic utilizes various input control signals from the Address Decode Logic 406, Word Counter 410, Write FIFO Control 374, and the Write FIFO 372 to produce three output signals. These three output signals are First Hit 420, Data Out (DO) Data 412, and Second Hit 424. These output signals are used by the WOBB MUX Control Decode Logic 414 to control the flow of data through MUX 378. Input signals received from the Address Decode Logic 406 include the WOBB Write Address (WOBB WR ADDR) 426 and the Address Hit (ADDR HIT) 428. The WOBB WR ADDR 426 represents the lower three (most significant) bits of the index into the Write FIFO. The ADDR HIT 428 specifies the upper three (least significant) bits of the word index into the current block of data. These values are catenated to form a six bit word counter. This six bit value is compared by Comparator 430 against the current value of the Word Counter 410. The Comparator 430 outputs a true signal if the two values are equal, otherwise a false signal is returned.

The AND gate 432, OR gate 434, and Flip-Flop 436 logic combination generates from the End Of Block 438 and Second Hit 424 signals an indication of whether the current data transfer is the last transfer (hit) for the block. This indicator is an input to AND gate 440, which is used to generate the First Hit signal 420. Other inputs to this AND gate 440 include the Write WOBB (WR WOBB) signal 442 received from the Write FIFO Control 374 as part of Line 380, and the Read Enable 0 444 and Read Enable 1 446 signals received from the Write FIFO 372 as part of Line 382. The WR WOBB signal 442 indicates that a WOBB operation is currently being performed. The Read Enable signals indicate which buffer within the Write FIFO 372 is being read from for this operation. The output of AND gate 440 is forwarded to Flip-Flop 448.

The DO Data 412 and Second Hit 424 signals are generated from the logic combination containing AND gate 450, OR gate 452, and AND gate 454. The Last Block signal 456, received from the Write FIFO Control 374 as part of Line 380, indicates that the current block is the last block in the data transfer. Flip-Flops 458, 460 hold the DO Data 412 and Second Hit 424 signals, respectively.

FIG. 14 is a diagram of the WOBB MUX Control Decode Logic. The WOBB MUX Control Decode Logic 414 uses the upper two bits of the WOBB WR ADDR 426 and the First Hit 420, Second Hit 424, and DO Data 412 signals to produce four control lines which select nibbles of data to be transferred, as shown in FIG. 12. These control lines are the WOBB MUX Control signals 0, 1, 2, and 3, labelled 462, 464, 466, and 468, respectively.

A system and method for updating portions of a block in a file currently being cached in a file cache system has been described above. This novel hardware implementation supporting one word granularity on data accesses has been shown to increase the system throughput for those situations where partial block updating is required.

The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patents is set forth in the appended claims.

What is claimed is:

1. A system for updating a selected portion of a file stored in a non-volatile storage within a file cache system coupled to a host computer system, comprising:

buffer means for storing a first selected portion and a second selected portion of a file received from the non-volatile storage, wherein said file is composed of a plurality of segments, each segment contains a plurality of blocks, each block contains a plurality of words, the unit of data transfer between the host computer system and the file cache system is one or more blocks specified by a number of blocks count, the size of a portion of said file to be updated is not equal to an integral multiple of the size of a block and said portion of said file to be updated may be stored in multiple contiguous blocks, said first selected portion of said file is delineated by a first word index within a first selected block of said file, said second selected portion of said file is delineated by a last word index within a last selected block of said file, said first selected block is the same as said last selected block for file updates of less than or equal to one block, and said portion of said file to be updated does not include but is contiguously between said first selected portion and said second selected portion of said file, write FIFO means, coupled to the host computer system, for storing said portion of file to be updated received from the host computer system, write control means, coupled to said write FIFO means, for controlling the selective transfer of said first selected portion of said file from said buffer means, said portion of said file to be updated from said write FIFO means, and said second selected portion of said file from said buffer means to the non-volatile storage by generating a plurality of selection control signals according to said first word index, said last word index, and said number of blocks count, and selection means coupled to said buffer means and the non-volatile storage, and connected to said write FIFO means and said write control means, for selecting said first selected portion of said file or said second selected portion of said file from said buffer means, or said portion of said file to be updated from said write FIFO means for transfer into the non-volatile storage according to said selection control signals received from said write control means.

2. A system for updating a selected portion of a file being stored in a non-volatile storage within a file cache system coupled to a host computer system buffer means for storing a first selected portion and a second selected portion of a file received from the non-volatile storage, wherein said file is composed of a plurality of segments, each segment contains a plurality of blocks, each clock contains a plurality of words, the unite of data transfer between the host computer system and the file cache system is one or more blocks specified by a number of blocks count, the size of a portion of said file to be updated is not equal to an integral multiple of the size of a block and said portion of said file to be updated may be stored in multiple contiguous blocks, said first selected portion of said file contains data starting from a first word of first selected block of said file up to but not including a word specified by a first word index, said second portion of said file contains data starting from a word immediately succeeding a word specified by a last word index within a last selected block of said file up to and including a last word in said last selected block, and said first selected block is the same as said last selected block for file updates of less than or equal to one block write FIFO means, coupled to the host computer system, for storing said portion of said file to be updated wherein said portion of said file to be updated does not include but is contiguously between said first selected portion and said second selected portion of said file and includes data starting from a word in said first selected block specified by said first word index up to and including a word in said last selected block specified by said last word index, said portion of said file to be updated being received from the host computer system, write control means, coupled to said write FIFO means, for controlling the selective transfer of said first selected portion of said file from said buffer means, said portion of said file to be updated from said write FIFO means, and said second selected portion of said file from said buffer means to the non-volatile storage by generating a plurality of selection control signals according to said first word index, said last word index, and said number of blocks count, and a multiplexor, coupled to said buffer means and the non-volatile storage, and connected to said write FIFO means, and said write control means to select said first selected portion of said file or said second selected portion of said file from said buffer means, or said portion of said file to be updated from said write FIFO means for transfer into the non-volatile storage according to said selection control signals received from said write control means.

3. The system of claim 2, further comprising a read FIFO means, coupled to the non-volatile storage and said buffer means for storing said first selected portion of said file and said second selected portion of said file received from the non-volatile storage.

4. The system of claim 3, further comprising a read buffer control means, coupled to said buffer means and said read FIFO means, for controlling the selective transfer of said first selected portion of said file from the non-volatile storage into said read FIFO means, and from said read FIFO means into said buffer means, and for controlling the selective transfer of said second selected portion of said file from the non-volatile storage into said read FIFO means, and from said read FIFO means into said buffer means.

5. The system of claim 4, further comprising a write buffer control means, coupled to said buffer means for controlling the selective transfer of said first selected portion of said file and said second selected portion of said file from said buffer means to said selection means.

6. The system of claim 5, said write control means further comprising:

first index means for storing said first word index;

second index means for storing said last word index;

blocks count means for storing said number of blocks count;

address decode means, coupled to said first index means and said second index means, for determining the address of the word in a selected portion of a file being processed, compare means, coupled to said blocks count means, said address decode means, said write buffer control means, and said write FIFO means, for controlling the continued transfer of words contained in said first selected portion of said file, said second selected portion of said file, and said portion of said file to be updated, and selection control decode means, coupled to said first index means, said second index means, said compare means, and said multiplexor, for controlling the selection of either said first selected portion of said file, said second selected portion of said file, or said portion of said file to be udpated, for transfer to the non-volatile storage.

7. An apparatus for updating a selected portion of a file stored in a non-volatile storage within a file cache system coupled to a host computer system, comprising:

a first buffer having a first selected file portion containing data from a file received from the non-volatile storage, wherein said file is composed of a plurality of segments, each segment contains a plurality of blocks, each block contains a plurality of words, the unit of data transfer between the host computer system and the file cache system is one or more blocks specified by a number of blocks count, the size of a portion of said file to be updated is not equal to an integral multiple of the size of a block and said portion of said file to be updated may be stored in multiple contiguous blocks, said first selected file portion including data from a first word of a first selected block of said file up to but not including a word specified by a first word index, a last buffer having a second selected file portion containing data from said file received from the non-volatile storage starting from a word immediately succeeding a word specified by a last word index within a last selected block of said file up to and including a last word in said last selected block, a write FIFO buffer, connected to the host computer system, for storing said portion of said file to be updated, wherein said portion of said file to be updated does not include but is contiguously between said first selection file portion and said second selected file portion and includes new data from a word in said first selected block of said file specified by said first word index up to and including a word in said last selected block of said file specified by said last word index, said new data being received from the host computer system, write control circuitry, connected to said write FIFO buffer, to selectively control the transfer of said file portions to the non-volatile storage by outputting a plurality of selection control signals according to said first word index, said last word index, and said number of blocks count, and a multiplexer, connected to said first buffer, said last buffer, said write FIFO buffer, said write control circuitry, and the non-volatile storage, for selecting said first selected file portion from said first buffer, said second selected file portion from said last buffer, or said portion of said file to be updated from said write FIFO buffer for transfer into the non-volatile storage according to said selection control signals.

8. The system of claim 7, further comprising a read FIFO buffer, connected to the non-volatile storage, said first buffer, and said last buffer, for receiving said first selected file portion and said second selected file portion from the non-volatile storage.

9. The system of claim 8, further comprising read buffer control circuitry connected to said first buffer, said last buffer, and said read FIFO buffer, for controlling the transfer of said first selected file portion from the non-volatile storage into said read FIFO buffer, and from said read FIFO buffer into said first buffer, and for controlling the transfer of said second selected file portion from the non-volatile storage into said read FIFO buffer, and from said read FIFO buffer into said last buffer.

10. The system of claim 9, further comprising write buffer control circuitry, connected to said first buffer and said last buffer, for controlling the transfer of said first selected file portion from said first buffer and said second selected file portion from said last buffer to said multiplexor.

11. The system of claim 10, said write control circuitry further comprising:

a first register for storing said first word index;

a second register for storing said last word index;

a third register for storing said number of blocks count;

address decode circuitry, connected to said first register and said second register, for determining the address of the word in said selected portion of a file being processed, compare circuitry, connected to said third register, said address decode circuitry, said write buffer control circuitry, and said write FIFO buffer, for controlling the continued transfer of words contained in said first selected file portion, said second selected file portion, and said portion of said file to be udpated, and selection control decode circuitry, connected to said first register, said second register said compare circuitry and said multiplexor, for controlling the selection of either said first selected file portion, said second selected file portion, or said portion of said file to be updated, for transfer to the non-volatile storage.

12. A system for updating a selected portion of a file stored in a non-volatile storage within a file cache system coupled to a host computer system, comprising:

buffer means for storing a first selected portion and a second selected portion of a file received from the non-volatile storage, wherein said file is composed of a plurality of segments, each segment contains a plurality of blocks, each block contains a plurality of words, the unit of data transfer between the host computer system and the file cache system is one or more blocks specified by a number of blocks count, the size of a portion of said file to be updated is not equal to an integral multiple of the size of a block and said portion of said file to be updated may be stored in multiple contiguous blocks, said first selected portion of said file contains data starting from a first word of a fist selected block of said file up to but not including a word specified by the first word index, said second portion of said file contains data starting from a word immediately succeeding a word specified by a last word index within a last selected block of said file up to and including a last word in said last selected block, and said first selected block is the same as said last selected block for file updates of less than or equal to one block write FIFO means, coupled to the host computer system, for storing said portion of said file to be updated, wherein said portion of said file to be updated does not include but is contiguously between said first selected portion and said second selected portion of said file and includes data starting from a word in said first selected block specified by said first word index up to and including a word in said last selected block specified by said last word index, said portion of said file to be updated being received from the host computer system, write control means, coupled to said write FIFO means, for controlling the selective transfer of said first selected portion of said file from said buffer means, said portion of said file to be updated from said write FIFO means, and said second selected portion of said file from said buffer means to the non-volatile storage by generating a plurality of selection control signals according to said first word index, said last word index, and said number of blocks count, said write control means including first index means for storing said first word index;

second index means for storing said last word index;

blocks count means for storing said number of blocks count;

address decode means, coupled to said first index means and said second index means, for determining the address of the word in selected portion of a file being processed compare means, coupled to said blocks count means, said address decode means, and said write FIFO means, for controlling the continued transfer of words contained in said first selected portion of said file, said second selected portion of said file, and said portion of said file to be updated, and selection control decode means, coupled to said first index means, said second index means, and said compare means, for controlling the selection of either said first selected portion of said file, said second selected portion of said file, or said portion of said file to be udpated, for transfer to the non-volatile storage, and a multiplexor, coupled to said buffer means and the non-volatile storage, and connected to said write FIFO means, and said write control means to select said first selected portion of said file or said second selected portion of said file from said buffer means, or said portion of said file to be updated from said write FIFO means for transfer into the non-volatile storage according to said selection control signals received from said write control means.

13. An apparatus for updating a selected portion of a file stored in a non-volatile storage within a file cache system coupled to a host computer system, a first buffer having a first selected file portion containing data from a file received from the non-volatile storage, wherein said file is composed of a plurality of segments, each segment contains a plurality of blocks, each block contains a plurality of words, the unit of data transfer between the host computer system and the file cache system is one or more blocks specified by a number of blocks count, the size of a portion of said file to be updated is not equal to an integral multiple contiguous blocks, said first selected file portion including data from a first word of a first selected block of said file up to but not including a word specified by a first word index, a last buffer having a second selected file portion containing data from said file received from the non-volatile storage starting from a word immediately succeeding a word specified by a last word index within a last selected block of said file up to and including a last word in last selected block, a write FIFO buffer, connected to the host computer system for storing said portion of said file to be updated, wherein said portion of said file to be updated does not include but is contiguously between said first selection file portion and said second selected file portion and includes new data from a word in said first selected block of said file specified by said first word index up to and including a word in said last selected block of said file specified by said last word index, said new data being received from the host computer system, a read FIFO buffer, connected to the non-volatile storage, said first buffer, and said last buffer, for receiving said first selected file portion and said second selected file portion from the non-volatile storage;

read buffer control circuitry, connected to said first buffer, said last buffer, and said read FIFO buffer, for controlling the transfer of said first selected file portion from the non-volatile storage into said read FIFO buffer, and from said read FIFO buffer into said first buffer, and for controlling the transfer of said second selected file portion from the non-volatile storage into said read FIFO buffer, and from said read FIFO buffer into said last buffer;

write control circuitry, connected to said write FIFO buffer, to selectively control the transfer of said file portions to the non-volatile storage by outputting a plurality of selection control signals according to said first word index, said last word index, and said number of blocks count, said write control circuitry including:
a first register for storing said first word index;
a second register for storing said last word index;
a third register for storing said number of blocks count;
address decode circuitry, connected to said first register and said second register, for determining the address of the word in a selected portion of a file being processed,
compare circuitry, connected to said third register, said address decode circuitry, said write buffer control circuitry, and said write FIFO buffer, for controlling the continued transfer of words contained in said first selected file portion, said second selected file portion, and said portion of said file to be updated, and
selection control decode circuitry, connected to said first register, said second register, and said compare circuitry, for controlling the selection of either said first selected file portion, said second selected file portion, or said portion of said file to be updated for transfer to the non-volatile storage;

a multiplexor, connected to said first buffer, said last buffer, said write FIFO buffer, said write control circuitry, and the non-volatile storage, for selecting said first selected file portion from said first buffer, said second selected file portion from said last buffer, or said portion of said file to be updated from said write FIFO buffer for transfer into the non-volatile storage according to said selection control signals; and write buffer control circuitry, connected to said first buffer and said last buffer, for controlling the transfer of said first selected file portion from said first buffer and said second selected file portion from said last buffer to said multiplexer.

* * * * *

UNITED STATES PATENT AND TRADEMARK OFFICE
CERTIFICATE OF CORRECTION

PATENT NO. : 5,555,391
DATED : September 10, 1996
INVENTOR(S) : Joseba M. DeSubijana, et al.

It is certified that error appears in the above-indentified patent and that said Letters Patent is hereby corrected as shown below:

Column 13, Line 30, after "system" add -- , comprising: --.

Column 13, Line 35, delete "clock" and substitute -- block --.

Column 13, Line 43, between "of" and "first" add -- a --.

Column 16, Line 25, delete "fist" and substitute -- first --.

Column 16, Line 60, between "in" and "selected" add -- a --.

Column 17, Line 20, after "system," add -- comprising: --.

Column 18, Line 50, delete "multiplexer" and substitute -- multiplexor --.

Signed and Sealed this

Fourth Day of February, 1997

Attest:

BRUCE LEHMAN

*Attesting Officer*     *Commissioner of Patents and Trademarks*